US012734538B2

(12) United States Patent
Kantimm

(10) Patent No.: US 12,734,538 B2
(45) Date of Patent: Sep. 15, 2026

(54) METHOD AND SYSTEM FOR DETERMINING A QUALITY PARAMETER OF A REPRESENTATION OF A COATING COMPOSITION

(71) Applicant: BASF COATINGS GMBH, Muenster (DE)

(72) Inventor: Thomas Kantimm, Muenster (DE)

(73) Assignee: BASF COATINGS GMBH, Muenster (DE)

( * ) Notice: Subject to any disclaimer, the term of this patent is extended or adjusted under 35 U.S.C. 154(b) by 334 days.

(21) Appl. No.: 18/577,078

(22) PCT Filed: Jul. 14, 2022

(86) PCT No.: PCT/EP2022/069771

§ 371 (c)(1),
(2) Date: Jan. 5, 2024

(87) PCT Pub. No.: WO2023/001691

PCT Pub. Date: Jan. 26, 2023

(65) Prior Publication Data

US 2024/0307906 A1 Sep. 19, 2024

(30) Foreign Application Priority Data

Jul. 20, 2021 (EP) .................................... 21186614

(51) Int. Cl.
*G01N 21/84* (2006.01)
*B05B 7/24* (2006.01)
(Continued)

(52) U.S. Cl.
CPC .................................. *B05B 12/084* (2013.01)

(58) Field of Classification Search
CPC .................. B05B 12/084; B05B 12/00; B05B 13/0431; B05B 7/04; B05B 12/122; G05B 13/04;
(Continued)

(56) References Cited

U.S. PATENT DOCUMENTS

2016/0313294 A1* 10/2016 Dattilo .................. G06Q 10/10
2021/0187526 A1 6/2021 Kundem et al.
(Continued)

FOREIGN PATENT DOCUMENTS

DE 4110520 C2 12/1996
WO 2014011741 A1 1/2014
WO 2021018595 A1 2/2021

OTHER PUBLICATIONS

International Search Report and Written Opinion for corresponding PCT/EP22/69771 mailed Sep. 8, 2022, 14 pages.

*Primary Examiner* — Brandi N Hopkins
(74) *Attorney, Agent, or Firm* — Armstrong Teasdale LLP

(57) ABSTRACT

A method and a system are provided for determining a quality parameter of a representation of a coating composition. More specifically, a method determine s a quality parameter of a modified or new representation of a coating composition, such as a mixing formula, by acquiring sensor data during application of the coating composition as well as surface property data of the prepared coating layer and comparing said data to predefined values, in particular predefined parameters and/or tolerances. The methods may be used for screening modified or new representations of coating compositions according to a quality criterion as well as a database including at least one modified or new representation of a coating composition, where the modified or new representation is provided to the database using the disclosed method.

18 Claims, 6 Drawing Sheets

(51) Int. Cl.
*B05B 12/08* (2006.01)
*G01N 21/25* (2006.01)
*G01N 21/57* (2006.01)
*G01N 33/32* (2006.01)

(58) Field of Classification Search
CPC ......... G06T 11/001; G06T 11/10; G06T 7/90; G06T 15/04; G06T 7/0004; G06T 19/00; G06T 7/408; G01J 3/463; G01J 3/462; G01J 3/46; G01J 3/504; G01J 3/50; G01J 3/0264; G06F 18/22; G06F 16/538; G06F 3/04847; G06F 30/20; G06Q 10/08; G06Q 10/06; B05D 5/005; B05D 5/06; B05D 7/26; B05D 5/00; C23C 30/00; G01N 33/32; G01N 21/25; G01N 21/8851; G01N 21/57; G06K 9/4652; G06K 9/6211; C09D 7/80; C09D 201/00; C09D 5/00; G05D 11/135; B01F 33/846; B01F 27/272; B01F 33/80; B01F 13/1066; B01F 13/1055; B01F 35/2205; B01F 33/8442; Y02P 90/30; C12N 1/00; B60S 5/00
See application file for complete search history.

(56) References Cited

U.S. PATENT DOCUMENTS

2021/0201535 A1 7/2021 Steenhoek et al.
2022/0259446 A1 8/2022 Steffens et al.

* cited by examiner

METHOD AND SYSTEM FOR DETERMINING A QUALITY PARAMETER OF A REPRESENTATION OF A COATING COMPOSITION

CROSS-REFERENCE TO RELATED APPLICATIONS

This application is a U.S. National Phase Application of International Patent Application No. PCT/EP22/69771, filed Jul. 14, 2022, which claims priority to European Patent Application No. 21186614.0, filed Jul. 20, 2021, each of which is hereby incorporated by reference herein.

FIELD

Aspects described herein generally relate to a method and a system for determining a quality parameter of a representation of a coating composition. More specifically, aspects described herein relate to a method and a system for determining a quality parameter of a modified or new representation of a coating composition, such as a mixing formula or recipe, by acquiring sensor data during application of the coating composition as well as surface property data of the coating layer prepared from the coating composition and comparing said acquired data to predefined values, in particular predefined parameters and/or tolerances. Moreover, aspects described herein relate to the use of the inventive method for screening modified or new representations of coating compositions according to a quality criterion as well as a database comprising at least one modified or new representation of a coating composition, wherein said modified or new representation is provided to the database using the inventive method.

BACKGROUND

Vehicles, in particular land vehicles such as automobile, motorcycle and truck bodies, are normally treated with multiple layers of coatings which enhance the appearance of the vehicle and also provide protection from corrosion, scratch, chipping, ultraviolet light, acid rain and other environmental conditions. Multicoat paint systems comprising basecoat and clearcoat layer(s) for automobiles and trucks have been commonly used over the past two decades.

Producing these multicoat paint systems generally involves electrophoretically depositing an electrocoat material on a metallic substrate, such as an automobile body, and curing said applied electrocoat material. The metallic substrate may undergo various pretreatments prior to the deposition of the electrocoat material—for example, by applying known conversion coatings such as phosphate coatings, more particularly zinc phosphate coats. Afterwards, a filler or primer-surfacer material may be applied to the cured electrocoat and cured. In case such a layer is present, at least one basecoat material comprising color and/or effect pigments is applied to said cured layer. However, it is also possible to apply at least one basecoat material directly to the cured electrocoating layer. In case of plastic substrates, a primer material may be applied prior to the application of a basecoat material to increase adhesion of the multilayer coating to the substrate. The at least one basecoat film or the topmost basecoat film thus produced is then coated with a clearcoat material without separate curing. The clearcoat film and all basecoat film(s) present are then jointly cured (so-called 2 coat 1 bake (2C1B) or 3 coat 1 bake (3C1B) method).

When film defects, such as peeling, discoloration, scratching or the like, arise in such multicoat paint systems they are normally repaired to restore the original appearance of the vehicle. If such film defects occur directly after OEM finishing, they are repaired directly at the OEM manufacturing site in the so-called "OEM automotive refinishing". If such defects occur at a later point in time, they are normally repaired in vehicle repair shops in the so-called "automotive refinishing". Refinishing processes can be broadly classified as edge to edge repairs, blend-in processes, and spot repairs. Edge to edge repairs are carried out when the part of the multilayer coating which is to be repaired is comparatively large and usually involve removing the damaged parts of the multilayer coating and refinishing the entire area. Spot repair is carried out when the part of the multilayer coating which is to be repaired is small or when the location of the part of the multilayer coating to be repaired is not in a prominent position.

Refinishing the entire area generally includes cleaning and sanding and, if necessary, filling the damaged area. Then, if necessary after further pretreatment, the damaged area and adjacent areas are usually coated with opaque coating agents, such as suitable basecoat materials. After drying the coating layer thus produced, the coating layer and the adjacent areas are usually coated with a clearcoat composition which is then dried together with the previously applied coating layer(s). In general, spot repairs involve sanding the spot which is to be repaired, painting the surface with an opaque coating material, drying the applied coating material, sanding the applied coating material and applying a clearcoat material. In order to decrease a color mismatch of the repaired area or spot, the repair is "blended" out beyond the area or spot itself. This is a process of decreasing the paint film build of the applied coating layers while moving further away from the repaired area or spot. Thus, the color gradually changes from the (incorrect) color on the area or spot to the (correct) color of the rest of the area. If this change is gradual enough, human vision does not perceive the mismatch. The requirements nowadays imposed on the refinishing of vehicles are extremely high. In visual and technological terms, therefore, the finished result is to be comparable with the baked original finish, i.e. the color of the repair must match that of the rest of the vehicle such that the repaired area is not distinguishable to the observer. Moreover, the mechanical properties of the repaired multilayer coating should be comparable to the mechanical properties of the original finish.

To achieve a similar visual appearance and mechanical properties after refinishing, the coating compositions used for the original finish could potentially be used for repairing the damaged area(s). A disadvantage of this, however, is that often only small amounts of the paint are needed for the repair and the coating compositions are not stable on storage for more than 12 months. This results in high amounts of waste because unused coating compositions which have exceeded the expiration date need to be disposed. A further disadvantage is that each color shade used in the OEM production line has to be stored, which requires large storage capacities.

To solve these problems, individual coating compositions are produced in the amounts required for the respective repair process. For this purpose, mixing systems are used in the automotive refinishing sector. These mixing systems usually comprise a pigment-free component, a number of differently pigmented tinting bases, and a component comprising one or more organic and/or inorganic thickeners for rheology control. The production of the respective coating composition from a mixing system has the advantage that not every color shade must be stocked individually, thus resulting in reduced distribution and warehousing costs. Moreover, waste is minimized because the desired color shade can be prepared in the required amounts.

A coating composition having a predefined color is prepared from the aforementioned components by mixing said components of the mixing system in defined amounts. The amount of each component necessary to achieve the predefined color is described by a so-called mixing formula. These mixing formulas are generally developed by manufacturers of refinish coating compositions using standard application parameters to ensure color reproducibility and are provided to customers, such as repair shops, via a database. The database may be a computer database or may be a library of color chips. A color chip is a color coated panel, which represents an available color including the mixing formula used to prepare the color.

To identify a mixing formula being suitable for a refinish process, a number of methods are known in the state of the art. A typical method uses a device (e.g., a spectrophotometer) that measures color characteristics of the painted surface, and matches the measurements to those archived in a computer database associated with mixing formulas. A list of suitable mixing formulas is then displayed to the finisher from which an appropriate one can be selected. Another traditional approach has been to provide a library of color chips of all colors and available alternates or variants of the colors of the color chips. The finisher may then select a best match mixing formula from this library. The selected mixing formula is then used to prepare a paint, which is manually applied to a test panel, cured and compared to the color of the original multilayer coating on the vehicle. Since the color of the multilayer coating generally varies from one vehicle to the next, or even from one part of a vehicle to another, the refinish paint produced from an existing mixing formula is often not a close enough color match within a given color code. The finisher must then adjust the color of the paint by adding small amounts of colored tints, i.e. by adjusting the existing mixing formula, which in many instances requires the finisher to make several iterations to close in on an acceptable match. This time-consuming process must be repeated in every repair shop because the adapted mixing formulas developed by one repair shop are normally not provided to other repair shops via a commonly accessible database.

It would therefore be desirable to provide these adapted mixing formulas to other repair shops, for example via a computer database, to reduce the time and effort associated with the color matching process. Since the color resulting from the coating material prepared according to the adapted mixing formula is highly dependent on the parameters used during application of the coating material, said adapted mixing formula must have a certain quality, i.e. the best matching color resulting from the adapted mixing formula must have been produced using standard application parameters. This quality ensures that the color of the adapted mixing formula can be reproduced by painters of other repair shops. The required quality of adapted mixing formulas is normally tested by a third person, such as the provider of the database, by applying the coating formulation obtained from said mixing formula using standard application parameters to a test panel, curing said coating composition and comparing the color of the resulting coating layer to the color obtained by the repair shop which has developed the adapted mixing formula. This process is time consuming and inefficient since the quality of each adapted mixing formula has to be reviewed manually prior to archiving it in the database.

It would therefore be desirable to provide efficient methods and systems which can be used directly at the repair shop and which are able to determine whether an adapted mixing formula fulfills predefined quality criteria, such as resulting in a coating layer providing the desired visual impression when the coating composition prepared from this mixing formula is applied using standard application parameters, thus allowing to efficiently screen adapted mixing formulas according to a quality criterion and to provide the adapted mixing formulas fulfilling the criterion to painters of other repair shops, for example via a computer database.

Definitions

"Representation of a coating composition" may refer to a representation of the coating composition in a readable form, such as a computer readable form or on paper. In particular, the representation of the composition may, e.g. be an instruction outlining the preparation of the coating composition, such as a mixing formula or a recipe. The mixing formula or recipe may contain information on the components, the amounts and optionally production parameters, such as temperature, stirring time, etc., necessary to prepare the coating composition.

"User" refers to the person operating the spray gun, such as a finisher being employed in a repair shop.

"Communication interface" may refer to a software and/or hardware interface for establishing communication such as transfer or exchange or signals or data. Software interfaces may be e. g. function calls, APIs. Communication interfaces may comprise transceivers and/or receivers. The communication may either be wired, such as ethernet, or it may be wireless. Communication interface may be based on or it supports one or more communication protocols. The communication protocol may a wireless protocol, for example: short distance communication protocol such as Bluetooth®, or WiFi, or HTTP(s) or TCP/PI, or long distance communication protocol such as cellular or mobile network, for example, second-generation cellular network ("2G"), 3G, 4G, Long-Term Evolution ("LTE"), or 5G. Alternatively, or in addition, the communication interface may even be based on a proprietary short distance or long distance protocol. The communication interface may support any one or more standards and/or proprietary protocols.

"Computer processor" refers to an arbitrary logic circuitry configured to perform basic operations of a computer or system, and/or, generally, to a device which is configured for performing calculations or logic operations. In particular, the processing means, or computer processor may be configured for processing basic instructions that drive the computer or system. As an example, the processing means or computer processor may comprise at least one arithmetic logic unit ("ALU"), at least one floating-point unit ("FPU)", such as a math coprocessor or a numeric coprocessor, a plurality of registers, specifically registers configured for supplying operands to the ALU and storing results of operations, and a memory, such as an L1 and L2 cache memory. In particular, the processing means, or computer processor may be a multicore processor. Specifically, the processing means, or computer processor may be or may comprise a Central Processing Unit ("CPU"). The processing means or computer processor may be a ("CISC") Complex Instruction Set Computing microprocessor, Reduced Instruction Set Computing ("RISC") microprocessor, Very Long Instruction Word ("VLIW") microprocessor, or a processor implementing other instruction sets or processors implementing a combination of instruction sets. The processing means may also be one or more special-purpose processing devices such as an Application-Specific Integrated Circuit ("ASIC"), a Field Programmable Gate Array ("FPGA"), a Complex Programmable Logic Device ("CPLD"), a Digital Signal Processor ("DSP"), a network processor, or the like. The methods, systems and devices described herein may be implemented as software in a DSP, in a micro-controller, or in any other side-processor or as hardware circuit within an ASIC, CPLD, or FPGA. It is to be understood that the term processing means or processor may also refer to one or more processing devices, such as a distributed system of processing devices located across multiple computer systems (e.g., cloud computing), and is not limited to a single device unless otherwise specified.

"Vehicle identification data" refers to data which can be used to identify a vehicle based on said data. Such data may include the vehicle identification number (VIN), part of the VIN, a manufacturer of the vehicle, a manufacturer plant site of the vehicle, make, model or model year of the vehicle, paint color code, production sequence of the vehicle or a combination thereof.

"Visual inspection" refers to the inspection of the surface by a person, such as a finisher, to determine surface property data of a produced coating layer or a produced multilayer coating, such as color, appearance, gloss, etc.

"Appearance" used herein refers to the perception in which the spectral and geometric aspects of a surface is integrated with its illuminating and viewing environment. In general, appearance includes visual texture such as coarseness caused by effect pigments, sparkle, or other visual effects of a surface, especially when viewed from varying viewing angles and/or with varying illumination angle.

"Computer readable medium" may refer to physical and other computer-readable media for carrying or storing computer-executable instructions and/or data structures. Such computer-readable media can be any available media that can be accessed by a general-purpose or special-purpose computer system. Computer readable media may include physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

"Database" may refer to a collection of related information that can be searched and retrieved. The database can be present on paper or in digital form, such as searchable electronic numerical, alphanumerical or textual documents, searchable files or commonly known databases. The database can be a set of electronic documents, photographs, images, diagrams, data, or drawings, residing in a computer readable storage medium that can be searched and retrieved.

SUMMARY

To address the above-mentioned problems in a perspective the following is proposed: a process for determining a quality parameter of a representation of a coating composition, said method comprising the steps of:

(i) providing a modified or new representation of a coating composition;

(ii) preparing the coating composition from the provided representation;

(iii) producing a coating layer on at least a part of a substrate by manually applying the coating composition prepared in step (ii) with a spray gun comprising a sensor unit, a processing unit and optionally a signal unit to at least part of the substrate while acquiring sensor data with the sensor unit;

(iv) optionally providing feedback to a user via the signal unit during manual application of the coating composition based on the sensor data acquired in step (iii);

(v) optionally repeating steps (i) to (iii) or steps (i) to (iv);

(vi) providing to a computer processor via a communication interface at least a part of the sensor data acquired in step (iii);

(vii) providing to the computer processor via the communication interface surface property data of at least one coating layer produced in step (iii);

(viii) determining with the computer processor at least one quality parameter of at least one representation provided in step (i) based on
the sensor data provided in step (vi), and
the surface property data provided in step (vii)

(ix) providing via the communication interface the at least one quality parameter determined in step (viii); and (x) providing the representation of the coating composition via the communication interface to at least one database if the quality of said representation is determined in step (viii) to be acceptable.

The proposed method greatly reduces the time to obtain the quality of the representation of the chemical composition, such as a mixing formula or a recipe, by reducing the necessity of determining whether the representation results in the desired visual impression using standard application parameters. In addition, the proposed method can be used to screen newly developed representations, such as newly developed mixing formulas or recipes, according to at least one quality criterion, such as providing a defined color under standard application parameters, thus allowing to select suitable representations without performing extensive experiments that are otherwise required to determine whether the criterion is fulfilled. Moreover, the inventive method allows to provide modified or new representations of chemical compositions, such as a modified or new mixing formula or a modified or new recipe, which fulfill certain quality criteria, such as resulting in a defined appearance using standard application parameters, to a database. This allows to provide access to said modified or new representations to users of other repair shops, thus increasing the number of available representations and reducing the time necessary to develop a suitable representation by each user in each repair shop.

Further disclosed is:

a system for determining a quality parameter of a representation of a coating composition, said system including:

- means for providing at least one modified or new representation of the coating composition;
- a spray gun for manually applying the coating composition to a substrate, the spray gun comprising a sensor unit for acquiring sensor data during operation of the spray gun, a processing unit for processing the acquired sensor data and optionally a signal unit for providing at least one signal in response to the processed sensor data;

at least one communication interface;

means for providing surface property data of at least one coating layer produced from the provided representation of the coating formulation;

means for determining at least one quality parameter of the provided modified or new representation of the coating composition.

The disclosure applies to the methods and systems disclosed herein alike. Therefore, no differentiation is made between methods and systems. All features which are disclosed in connection with the method of the invention are equally applicable to the system disclosed herein.

Further disclosed is the use of the method of the invention for screening modified or new representations of coating compositions according to a quality criterion. The quality criterion may be a classifier being indicative of the acceptability of the provided modified or new representation of the coating composition as previously described. This allows to screen modified or newly developed representations of coating compositions, such as modified or new mixing formulas, with respect to their suitability in refinish processes. Thus, the time consuming determination of the quality of modified or newly developed representations of coating compositions, such as mixing formulas or recipes, by applying the coating compositions prepared from said representations to a test panel under standard application parameters and determining whether the coating layers thus produced fulfil the desired quality in terms of matching visual impression is no longer necessary.

The inventive method may also be used to train application robots with the acquired sensor data because the quality parameter ensures that a sufficiently high quality in terms of application parameters is used, thus reliably providing the desired surface property/properties.

Further disclosed is a system comprising a modified or new representation of a coating composition, and a quality parameter, wherein the quality parameter is determined according to the method disclosed therein.

Further disclosed is a database comprising at least one modified or new representation of a coating composition, wherein the modified or new representation of the coating composition is provided to the database according to the method disclosed therein.

EMBODIMENTS

Embodiments of the Inventive Method

Step (i):

In step (i) of the inventive method, a modified or new representation of the coating composition is provided. Providing the modified representation may include changing at least one parameter described in a provided existing representation, such as amounts, ratios, production parameters, for example mixing time, stirring rate, etc. "Existing representation" refers to representations already being present, for example on paper or on a computer readable medium, such as a file or database. The existing representation(s) may be present in physical form, for example on paper or on color chips, or in digital form, for example by storing said representation(s) on a computer readable medium, in particular in a database. With particular preference, the existing representation(s) are stored in a database. In case the database is present in physical form, such as on paper, the database may include a table of contents, such that the existing representation(s) can be retrieved using the table of contents.

In one example, the existing representation(s) may be provided using vehicle identification data, for example by providing the VIN via a communication interface, obtaining existing representation(s) based on the provided vehicle identification data, and providing said obtained representation(s).

In another example, providing the existing representation may include providing surface property data, obtaining existing representation(s) based on the provided data, and providing said obtained representation(s). The surface property data may be obtained by measuring the color, appearance, gloss, etc. of the coated substrate having defect site(s) at undamaged site(s) with a suitable measuring device, such as a spectrophotometer, a digital camera or a gloss meter. The surface property data may be provided via a communication interface to a database.

The existing representation(s) may be obtained by searching a database for said representation(s) based on the provided vehicle identification or surface property data. The database comprises vehicle identification data or surface property data associated with existing representations, such as mixing formulas or recipes. The communication interface may comprise a display having a GUI which can be used by the user to enter the VIN or to display the provided surface property data and to provide, i.e. to display, the existing representation(s) retrieved from the database based on the inputted VIN or provided surface property data to the user. The existing representation(s) retrieved from the database may be sorted according to a relevance criterion and may be displayed to the user together with said criterion and optionally further comments.

In an alternative aspect, providing the representation in step (i) may include providing a new representation of the coating composition. Providing a new representation may include defining parameters, such as amounts, ratios, production parameters, etc. without using an existing representation as a basis. Development of a new representation may be performed using an application or tool. In one example, the application or tool may comprise a simulation or prediction function which can predict whether the developed representation provides the desired surface properties to support the development. In another example, the application or tool can provide a newly developed mixing formula based on provided data, such as surface property data. Such applications or tools are commonly known in the state of the art and may include the use of trained neural networks to select appropriate amounts and components of the mixer system.

The modified or new representation(s) of the coating composition may be stored on a computer readable medium or on paper, in particular on a computer readable medium, such as a computer file or a database. Storing the modified or new representation of the coating composition on a computer readable medium allows easy retrieval of said stored representation(s).

Providing the modified or new representation of the coating composition may include providing a modified or new mixing formula or a modified or new recipe. With particular preference, a modified or new mixing formula is provided. The mixing formula or recipe include information on the ingredients, such as chemical name, lot number, commercial name, etc., their amounts or ratio and optionally production parameters, such as temperature, stirring time, etc., necessary to produce the coating composition from these ingredients.

Step (ii):

The coating composition is prepared in step (ii) by mixing the respective components, such as the contents of containers or raw materials, according to the modified or new representation provided in step (i), in particular according to the amounts/ratio and optionally production parameters listed in said modified or new representation, such as a modified or new mixing formula or a modified or new recipe. The container may comprise a tinting base, an unpigmented base, a reducer base or a hardener composition commonly used in automotive refinishing. Tinting bases used in refinish mixing systems contain at least one pigment, such as colour pigments and/or effect pigments, being dispersed in at least one binder. Unpigmented bases used in refinish mixing systems contain at least one binder and is preferably free of pigments, i.e. preferably contains 0% by weight of pigments, based on the total weight of the unpigmented base. The binder(s) in the unpigmented base may be the same binder(s) being present in the tinting base or may be different binder(s). Reducer bases used in refinish mixer systems contain at least one rheology agent in a solvent and is used to control the viscosity of the coating composition. Hardener compositions used in refinish mixer systems contain at least one crosslinking agent which reacts with at least one binder being present in the unpigmented base and/or the tinting base to form a cured coating film after application of the coating composition prepared from mixing said hardener with the unpigmented base and/or the tinting base and optionally the reducer base. The tinting base, unpigmented base, reducer base and hardener base can be solvent borne or aqueous compositions. Suitable tinting bases, unpigmented bases, reducer bases and hardener compositions are, for example, disclosed in DE 4110520A1, WO 2021/018594 A1 and WO 2021/018595 A1. A pigmented coating composition, such as a basecoat composition, may be prepared by mixing the tinting base, the unpigmented base and optionally the reducer base in the ratios given in the representation, such as the mixing formula. A clearcoat composition may be prepared by mixing the unpigmented base, the hardener composition and optionally the reducer base in the ratios given in the representation, such as the mixing formula.

In an aspect, the prepared coating composition is a liquid coating composition or a powder coating composition. With particular preference, the prepared coating composition is a liquid coating composition. A liquid coating composition contains solvents as a carrier for the non-volatile content of the coating material, such as pigments and binders. The liquid coating composition can be a clear liquid or a dispersion. The solvents can be organic solvents and/or water. In contrast, a powder coating composition is solvent free or only contains solvents in residual amounts.

Step (iii):

In step (iii), a coating layer is produced on at least part of a substrate by manually applying the coating composition prepared in step (ii) with a spray gun comprising a sensor unit, a processing unit and optionally at least one signal unit to at least part of the substrate. During manual application of the coating composition, sensor data is acquired using the sensor unit of the spray gun. In contrast to automatic application using robots, manual application of a coating composition to a substrate using a spray gun operated by a user is prone to errors because reproducibility of the manual application is significantly lower and the quality of the application highly depends on the skills of the user performing said application. The inventive method offers a possibility to check the quality of the application by comparing the application parameters acquired during the manual application to predefined thresholds to allow correction of incorrect handling of the spray gun as described in relation to optional step (iv). Moreover, the inventive method allows to determine the quality of the modified or new representation by comparing the application parameters acquired during the manual application as well as the appearance of the resulting coating layer to predefined thresholds (see step (viii)) and provides access to the modified or new representation having an acceptable quality to other users, such as finishers in other repair shops, via a database.

In an aspect, the substrate is selected from metallic substrates, plastic substrates, substrates comprising metallic and plastic parts, metallic or plastic substrates comprising at least one coating layer or metallic or plastic substrates comprising at least one coating layer having defective site(s), in particular metallic or plastic substrates comprising at least one coating layer having defective site(s). Suitable metal substrates are selected from the group comprising or consisting of steel, iron, aluminum, copper, zinc and magnesium substrates as well as substrates made of alloys of steel, iron, aluminum, copper, zinc and magnesium. Suitable plastic substrates are basically substrates comprising or consisting of (i) polar plastics, such as polycarbonate, polyamide, polystyrene, styrene copolymers, polyesters, polyphenylene oxides and blends of these plastics, (ii) synthetic resins such as polyurethane RIM, SMC, BMC and (iii) polyolefin substrates of the polyethylene and polypropylene type with a high rubber content, such as PP-EPDM, and surface-activated polyolefin substrates. The plastics may furthermore be fiber-reinforced, in particular using carbon fibers and/or metal fibers. Metallic or plastic substrates comprising at least one coating layer may be selected from metallic or plastic substrates comprising at least one of the following coating layers: electrocoat layer, primer layer, primer-surfacer layer, basecoat layer, clearcoat layer. The coating layer(s) can be dried or cured. Drying normally precedes the curing and is performed at lower temperatures and/or for shorter periods of time. The dried coating layer is still soft and tacky while the cured coating layer is no longer soft or tacky and does not undergo any further significant change in its properties, such as hardness or adhesion on the substrate, under further exposure to curing conditions. Metallic or plastic substrates comprising at least one coating layer having defective site(s), refer to substrates already comprising at least one coating layer, preferably a cured multilayer coating, having at least one film defect(s), such as peeling, discoloration, scratching or the like.

In one example, the substrate may be an automotive vehicle, including but not limited to automobiles, trucks, and tractors. The substrate can have any shape but is usually in the form of automotive or automotive body component such as a body, a hood, a door, a fender, a bumper and/or a trim. In another example, the substrate may be a test panel. Such test panels can be used for matching the visual impression resulting from the produced coating material with the visual impression of the coating on undamaged site(s) of the automotive vehicle.

In an aspect, the coating layer produced in step (iii) is a pigmented coating layer or a clearcoat layer. "Pigmented coating layer" in the context of the present invention denotes a coating layer comprising at least one pigment and/or dye. Pigments can be selected from colouring and/or effect pigments. The pigmented coating layer may be a basecoat layer. "Basecoat layer" may refer to a colour-imparting intermediate coating layer commonly used in automotive refinishing and is normally opaque, i.e. it fully hides the underlying substrate. The basecoat material used to prepare the basecoat layer may be formulated as a solid color (straight shade) or effect color coating. "Effect color coatings" generally contain at least one effect pigment and optionally other colored pigments or spheres which give the desired color and effect. "Straight shade" or "solid color coatings" primarily contain colored pigments and exhibit no visible flop or two-tone metallic effect. "Clearcoat layer" in the context of the present invention denotes a transparent or semi-transparent coating layer, i.e. a coating layer which does not fully hide the underlying coating layer(s). The clearcoat layer is normally the topmost layer of a multilayer coating and protects the underlying coating layer(s) from environmental influences. The clearcoat layer may be completely transparent, i.e. it may not comprise any colored pigments, colored dyes or fillers, semi-transparent and uncolored, i.e. it may comprise matting agents, or semi-transparent and colored, i.e. it may contain small amounts of coloring pigments or coloring dyes.

In an aspect, the spray gun manually operated in step (iii) is a pneumatic or electrostatic spray gun, in particular a pneumatic spray gun. Suitable pneumatic or electrostatic spray guns used for refinishing of automobiles are known to the person skilled in the art. Such spray guns typically comprise a body having a spray nozzle. Connected to the body is a reservoir comprising the coating composition to be applied to the substrate as well as means to apply the coating composition to the substrate, such as compressed air or compressed air in combination with electricity. The reservoir may be a single item, or the spray gun may be configured so as to be provided with separate reservoirs and compressed air feeds.

In an aspect, the sensor unit, the processing unit and optionally the signal unit may be configured as a single unit. The single unit is attached to the body of the spray gun, for example by using suitable attachment means, such as adapters, screws, or the like. "Single unit" may refer to a unit comprising the sensor unit, the processing unit and optionally the signal unit, i.e. they are physically attached to each other. In an alternative aspect, at least one of the sensor unit, the processing unit and optionally the signal unit may be configured as a separate unit. "Separate unit" may refer to a unit, such as the sensor unit, the processing unit or the signal unit, not being physically attached to the other unit(s) but being attached separately from the other unit(s) on the body of the spray gun. In one example, the sensor unit, the processing unit and optionally the signal unit may each be configured as a separate unit. In another example, the sensor unit may be configured as separate unit. In yet another example, the processing unit may be configured as separate unit. In yet another example, the signal unit may be configured as separate unit.

In an aspect, the sensor unit, the processing unit and optionally the signal unit or the single unit may be permanently attached to the spray gun or may be detachable. A detachable unit, in particular a detachable single unit, provides more flexibility, because it can be mounted on different spray guns if needed, thus minimizing the number of spray guns requiring permanently attached unit(s). With particular preference, the sensor unit, the processing unit and optionally the signal unit or the single unit is a detachable unit which can be mounted on spray guns of various manufacturers.

In an aspect, the sensor unit may include at least one sensor. This sensor may be selected from distance sensors, orientation sensors, acceleration sensors, LiDAR sensors, pressure sensors, paint flow rate sensors, temperature sensors, humidity sensors and combinations thereof. The distance sensor is operable to determine the distance of the spray gun from the substrate. The orientation sensor is operable to determine the orientation of the spray gun relative to the substrate. Suitable orientations sensors include rotation sensors, position sensors, gyroscopic sensors, inclinometers and combinations thereof. During movement of the spray gun over the substrate, the acceleration sensor is operable to determine the direction, speed, and acceleration characteristics of such movement. The LiDAR sensor is operable to determine the contour of the substrate. The pressure sensor is operable to determine the pressure of the compressed air while the paint flow rate sensor is operable to determine the flow rate of the coating composition applied with the spray gun. The temperature and humidity sensors are operable to determine the temperature and humidity of the room in which the coating composition is applied to the substrate. Suitable distance sensors include ultrasonic sensors, LiDAR sensors, radar sensors or a combination thereof. With particular preference, the sensor unit includes at least two of the aforementioned sensors, in particular a combination of orientation and acceleration sensors or a combination of orientation, acceleration and distance sensors.

In an aspect, the processing unit of the spray gun may comprise a microcontroller or microprocessor. Microcontrollers or microprocessors refer to semiconductor chips that contain a processor as well as peripheral functions. In many cases, the working and program memory is also located partially or completely on the same chip. The processing unit in the spray gun is used, as described later on, to provide feedback to the user of the spray gun during operation of the spray gun.

In an aspect, the signal unit may provide at least one optic and/or acoustic and/or haptic signal. Optic signals may include lights. Acoustic signals may include sounds. Haptic signals may include vibrations.

In an aspect, the sensor data acquired in step (iii) during manual application of the coating composition may be selected from data on the distance between the spray gun and the substrate, data on the orientation of the spray gun with respect to the substrate, data on the movement of the spray gun, data on the contour of the substrate, data on the pressure of the compressed air, data on the flow of the coating composition, temperature data, humidity data and combinations thereof. With particular preference, at least two different types of aforementioned data are acquired in step (iii).

Optional Step (iv):

In optional step (iv), feedback is provided to the user during manual application of the coating composition with the spray gun. In an aspect, providing feedback to a user during manual application of the coating composition with the spray gun may include the following steps:

- providing the sensor data acquired in step (iii) via a communication interface to the processing unit of the spray gun,
- processing with the processing unit the provided sensor data to determine whether the provided data is within or outside at least one predefined value, in particular at least one predefined parameter and/or tolerance, and
- providing with the signal unit at least one signal to the user in response to the processed sensor data.

Providing feedback to the user during operation of the spray gun, in particular during performing step (iii) described above, i.e. during application of the coating composition, allows to avoid application errors, which may result in an undesirable optical appearance of the resulting coating layer.

The at least one predefined value may be selected from distance value/(s), orientation value(s), movement value(s), pressure value(s), paint flow value(s), temperature value(s), humidity value(s) or a combination thereof. The value(s) may include numerical values or ranges of numerical values. The value(s) may be provided prior to operation of the spray gun to the processing unit via the communication interface. The communication interface may comprise a display that presents a user interface (e.g. a GUI) to the user that provides the user with an option to input the aforementioned value(s) or to import said tolerances from a database. The user interface may be presented via a web page or via a dedicated application running on a client machine. In response to the processed sensor data, i.e. in response to determining whether the provided sensor data is within at least one predefined value, the signal unit provides at least one signal unit to the user. The provided signal may be selected from optic signals, acoustic signals, haptic signals or a combination thereof. Suitable optic signals include lights. Suitable acoustic signals include sounds. Suitable haptic signals include vibration. Different kinds of signals, for example different light colours, different sounds or different vibration strengths may be used to illustrate to the user whether the spray gun is operated within the predefined value(s), on the border of the predefined value(s) or outside the predefined value(s). This allows a real-time guidance of the user during application of the coating composition because the user gets real-time feedback on whether the spray gun is operated correctly or not. Errors in handling can be corrected instantly, thus ensuring that the application fulfils predefined standard application value(s).

Steps (i) to (iii) or steps (i) to (iv) may be repeated several times if more than one coating composition, such as a colored basecoat composition and a clearcoat composition, is to be applied to the substrate. If steps (i) to (iii) or steps (i) to (iv) are repeated at least once, at least one representation provided in step (i) is a modified or new representation as previously mentioned. Thus, if steps (i) to (iii) or steps (i) to (iv) are performed, for example, twice, at least one representation provided in step (i) is a modified or new representation while the other representation provided in step (i) may be an existing representation or a modified/new representation. In one example, the coating compositions may be applied wet-on-wet, i.e. without curing the first coating composition before applying subsequent coating composition(s). In this case, the applied coating composition may be dried before applying subsequent coating composition(s) and all applied coating compositions are jointly cured at the end. In another example, each coating composition may be fully cured before applying a further coating composition.

Step (vi):

In step (vi), at least a part of the sensor data acquired in step (iii) is provided via a communication interface to a computer processor. With particular preference, all sensor data acquired in step (iii) is provided to the computer processor in step (vi). In an aspect, the communication interface may include Bluetooth or WiFi. In a further aspect, the computer processor may be included in a mobile communication apparatus, such as a mobile phone, smartphone or tablet computer, a personal computer, a laptop, or a computer kiosk.

Step (vii):

In step (vii), surface property data of at least one coating layer produced in step (iii) is provided to the computer processor via the communication interface. In case step (iii) is repeated several times, surface property data is preferably provided after the last coating layer is applied and cured, i.e. after the desired multilayer coating is obtained.

In an aspect, providing surface property data may include determining surface property data of at least one coating layer applied in step (iii) and providing the determined surface property data to the computer processor via the communication interface. The surface property data may be determined by visual inspection or by measuring the surface property with a measuring device. Visual inspection may include visual comparison of the colour, appearance, gloss, etc. of the produced coating layer with the surrounding coating layer. The obtained result, such as visual match or visual non-match, may then be provided to the computer processor via the communication interface. The communication interface may comprise a display that presents a user interface (e.g. a GUI) to a user that provides the user with an option to input the obtained visual inspection result. Measuring the surface property with a measuring device may include using a multi-angle or spherical geometry colour measuring device, a spectrophotometer, a digital camera or any other suitable device. The measuring device may be connected to the computer processor via a communication interface such that the measured data can be provided to said computer processor via said communication interface. The communication interface may be wireless, such as Bluetooth or WiFi, or wired, such as ethernet, USB cable etc.

In an aspect, the surface property data provided in step (vii) may be selected from color data, appearance data, gloss data, thickness data, roughness data, hardness data and combinations thereof, in particular color data and/or appearance data. Color data may include color space data, reflectance data or other suitable color attributes. One example of color space data are defined by L*a*b*, where L* represents luminous intensity, a* represents a red/green appearance, b* represents a yellow/blue appearance. Another example of color space data are defined by L*, C*, h, where L* represents lightness, C* represents chroma, and h represents hue.

Step (viii):

In step (viii), at least one quality parameter of the modified or new representation of the coating composition, such as a modified or new mixing formula, provided in step (i) is determined with the computer processor based on the sensor data provided in step (vi) and the surface property data provided in step (vii). In an aspect, determining the quality of the provided modified or new representation of the coating composition may include providing at least one predefined application value, in particular at least one predefined application parameter and/or tolerance, and at least one predefined surface property value, in particular at least one predefined surface property parameter and/or tolerance, to the computer processor and determining with the computer processor if the sensor data provided in step (vi) is within at least one predefined application value and if the surface property data provided in step (vii) is within at least one predefined surface property value.

The communication interface preferably comprises a display that presents a user interface (e.g. a GUI) to a user that provides the user with an option to input the aforementioned values or to import said values from a computer readable medium, such as a database. The user interface may be presented via a web page or via a dedicated application running on a client machine. Providing the predefined application value(s) and/or the predefined surface property value(s) may include providing an existing representation, obtaining the predefined application value(s) and/or the predefined surface property values(s) based on the provided representation and providing the obtained predefined application value(s) and/or the predefined surface property value(s). The existing representation is corresponding to the representation used as a basis to provide a modified representation in step (i) or is corresponding to the representation provided in step (i). The step of obtaining the predefined application value(s) and/or the predefined surface property value(s) may include retrieving said value(s) from a database based on the provided representation. The database includes the existing representation(s) associated with the predefined application value(s) and/or predefined surface property values(s).

The predefined values may include numerical values or range(s) of numerical values for the data provided in steps (vi) and (vii).

The at least one predefined application value(s) may be selected from a distance tolerance, an orientation tolerance, a movement tolerance, a pressure tolerance, a flow tolerance, a temperature tolerance, a humidity tolerance or a combination thereof. The predefined surface property values may include a predefined color difference, a predefined appearance difference, a predefined gloss difference, a predefined thickness difference, a predefined roughness difference, a predefined hardness difference and combinations thereof. Suitable color tolerances include $\Delta L^*$, $\Delta C^*$, $\Delta h^*$ or $\Delta L^*$, $\Delta a^*$, $\Delta b^*$. The calculation to determine these tolerances may be accomplished using any suitable mathematical calculation as is known in the art.

In an aspect, the quality parameter is a classifier being indicative of the acceptability of the provided modified or new representation of the coating composition. The acceptability may be derived from predefined application and surface property value(s) previously mentioned. The quality of the modified or new representation of the coating composition, such as a modified or new mixing formula or a modified or new recipe, may be acceptable if the sensor data provided in step (vi) is within at least one previously mentioned application value and if the surface property data provided in step (vii) is within at least one previously mentioned surface property value. With particular preference, a set of predefined application and surface property values is used to determine the quality parameter. Depending on the quality parameters that need to be fulfilled, the set may be one-dimensional or multidimensional. The value(s) that need to be fulfilled for an acceptable surface property of the produced coating layer may be defined by the user as previously mentioned. The predefined application value(s) may be defined by a third party, for example by the manufacturer of the refinish coating compositions and may be provided to the computer processor via the communication interface using a database, in which said value(s) are stored. The value(s) may be retrieved by using information on the existing representation, such as the existing mixing formula used for modification, commercial product names, recipe number, recipe name, etc., used to prepare the coating composition.

Step (ix):

In step (ix), the determined at least one quality parameter of the modified or new representation of the coating composition is provided via the communication interface. Providing said at least one parameter may include displaying said determined at least one quality parameter via the communication interface comprising a display to a user. The display may comprise a GUI. In addition to displaying the determined quality parameter, the predefined value(s) used for the determination of said quality parameter(s) as well as the acquired sensor data and provided surface property data may be displayed to the user. Displaying said information may include highlighting data which is outside of the predefined value(s) to increase user comfort.

Step (x):

In step (x), the modified or new representation of the coating composition is provided via the communication interface to at least one database if the quality of said modified or new representation is determined in step (viii) to be acceptable.

Providing the modified or new representation of the coating composition via the communication interface to at least one database in step (x) if the quality of the provided modified or new representation is determined to be acceptable may include inputting or importing said modified or new representation into the database. The database may already contain at least one representation of a coating composition. With particular preference, the database already comprises various representations, such as mixing formulas. The database may be the same database used to provide an existing representation, which was used to generate the modified representation provided step (i). In one example, inputting or importing may be done by the user via a display comprising a graphical interface by entering the modified or new representation, such as the modified or new mixing formula or the modified or new recipe, optionally in combination with the acquired surface property data and further information, such as vehicle identification data, into the database or by importing said modified or new representation from a computer readable medium, such as a file or a database. In another example, the user may forward the modified or new representation along with the determined quality of the representation, and optionally the acquired sensor and surface property data and vehicle identification data to the provider of the database and the provider of the database may then input or import the provided data. Input or import of a new or modified representation may result in submitting a notice on the added representation to other users of the database. The quality of the modified or new representation of the coating composition is acceptable if the sensor data provided in step (vi) is within at least one predefined application value as previously mentioned and if the surface property data provided in step (vii) is within at least one predefined surface property value as previously mentioned.

The proposed method allows to provide modified or new representations, such as mixing formulas or recipes, having a predefined quality to other users, such as repair shops, via the database. Since the quality of the modified or new representation is determined directly after production of the coating layer, a time-consuming quality check of the modified or new representation by a third party is redundant, thus allowing to provide modified or new representation efficiently and quickly to other users.

Further Steps:

In an aspect, the process may further include the steps of (xi) analyzing with the computer processor sensor data provided in step (vi); and/or (xii) optionally providing recommendations via the communication interface if the sensor data provided in step (vi) and/or the surface property data provided in step (vii) is outside of predefined value(s); and/or (xiii) generating a further representation if the sensor data provided in step (vi) and/or the surface property data provided in step (vii) is outside of predefined value(s).

In an aspect, the step (xi) of analyzing with the computer processor the provided sensor data includes comparing at least part of the provided sensor data to at least one predefined value associated with the provided sensor data. This step may be performed during operation of the spray gun (i.e. during step (ii)) or after completion of the application of the coating composition. The result of the analysis may be displayed to the user via a GUI using graphical representations, such as bar charts. In case the analysis is performed in real-time (i.e. during spraying in step (ii)), the graphical representations may be updated in real-time to increase user guidance during the spraying process. In one example, analyzing the provided sensor data may include analyzing the movement, in particular movement patterns, of the user during application of the coating composition with the spray gun and optionally providing the result of the analysis via a communication interface, in particular via a communication interface comprising a display, to the user. The movements may be analyzed by comparing the data acquired by the distance and/or position and/or acceleration sensors to predefined distance and/or position and/or acceleration value(s). Said data may also be used to depict the movement of the user during operation of the spray gun via an image by comparing the movement of the user with a predefined movement and depicting deviations. This may be particular useful if analyzing is done in real-time and the analysis is displayed to the user during operation of the spray gun because the user can correct the movements in case the deviation from the predefined movement is outside of the predefined value(s).

In another example, analyzing the sensor data may include comparing the temperature and/or humidity and/or pressure and/or paint flow data acquired in step (iii) to predefined value(s) and optionally displaying the result of the analysis via a communication interface, in particular via a communication interface comprising a display, to the user. The displayed data may be used to correct settings by applying the coating composition to a test panel and checking whether the acquired data is within the predefined value(s) before applying the coating composition to at least part of a substrate to be repaired.

The proposed method further including step (xi) allows to analyze and optimize the application of the coating material prepared from the modified or new representation, such as a mixing formula, to achieve optimum visual results, in particular optimum color matching results, during automotive refinishing. In case of undesired optical results, i.e. non-matching colors of refinished and original surface parts, the analysis can provide a quick and intuitive overview of the application parameters and allows to easily and quickly assess whether the undesired optical result is due to an unsuitable modified or new representation selected for refinishing or to application parameters being outside the predefined tolerances. In case the undesired optical result is due to an unsuitable modified or new representation, said modified or new representation may be further modified as previously described and the process disclosed herein may be repeated using the further modified representation.

Displaying recommendations in step (xii) via the communication interface in case the sensor data provided in step (vi) and/or the surface property data provided in step (vii) is outside of predefined value(s) may include using a display to present the recommendations to the user. The recommendations may be stored on a computer readable medium, such as a database. In one example, the computer processor may access a database containing the recommendations and may retrieve respective recommendations based on the result of the determination in step (viii) provided via the communication interface to the processor. Said retrieved recommendations may then be displayed to the user via the communication interface. In one example, the recommendation may be in the form of a text message, such as "Distance of spray gun during application of coating material not ok. Repeat spraying process using the correct distance to obtain better results.". In another example, the recommendation may be in the form of a graphical representation, such as bars, target circles etc, showing the result of the analysis in combination with the acceptable value(s) or range. Text message(s) may be displayed to increase user comfort. The use of graphical representations may be preferred since the user can easily assess the allowable parameter range/value(s) as well as his own performance with respect to the allowable parameter range/value(s).

Generating a further digital representation if the sensor data provided in step (vi) and/or the surface property data provided in step (vii) is outside of predefined value(s) in step (xiii) may include calculating a further representation based on the provided modified or new representation and the determined surface property data using the method described in European patent application number EP 20213635.4. Briefly, this method includes

- optionally providing the modified or new representation of step (i) and surface property data of step (vii) via a communication interface to a computer processor,
- providing via a communication interface to a computer processor a target color of a coating layer,
- optionally retrieving with the computer processor via the communication interface from a database specific optical data of individual color components associated with the representation provided in step (i),
- providing via the communication interface to the computer processor a numerical method and a physical model, wherein the numerical method is configured to optimize application adaption parameters by minimizing a given cost function starting from a given set of initial application adaption parameters, the given cost function being particularly chosen as a color difference between the provided surface property data and predicted surface property data of the provided representation, and the physical model is configured to predict the color of the provided representation by using as input parameters the color formulation associated with the provided representation and the retrieved specific optical data of the individual color components and respective preliminary application adaption parameters resulting in the course of optimization,
- calculating with the computer processor application adaption parameters using the provided numerical method and the physical model by comparing the recursively predicted color of the provided representation with the provided surface property data until the given cost function falls below a given threshold,
- calculating using the provided target color and calculated application adaption parameters as input parameters for the paint color formulation calculation algorithm, a modified representation with optimized concentrations of individual color components as target color formulation for a target paint coating when the target paint coating is applied on a substrate using the sensor data acquired in step (iii), and providing the modified representation via a communication interface.

This method may either be performed by the computer processor which is used to perform step (viii) of the inventive method or with a further computer processor being separate from the processor performing step (viii). In the latter case, the modified or new representation of step (i) and the surface property data needs to be provided via a communication interface to the further computer processor. The further computer processor may be located within a further computing device, such as a local computing device or a computing device located in a cloud environment.

The specific optical data of individual color components may be retrieved with the computer processor from the database based on the representation provided in step (i). For this purpose, the database comprises the specific optical data of individual color components interrelated with the representations of coating compositions. This step is generally optional and is only performed if the specific optical data of individual color components is not already contained in the digital representation provided in step (i). The specific optical data of the individual color components is determined on the basis of known reference paint coatings with known reference color formulations and known measured reference colors, respectively, wherein the reference paint coatings are applied onto a substrate using a reference paint application process, respectively Providing the target color via a communication interface to the computer processor may include retrieving the target color associated with the representation provided in step (i) from a database based on the provided digital representation. The database contains the target colors interrelated with the respective representation of the coating layer.

Each application adaption parameter may be assigned to an adaption measure of a number of different adaption measures, such as layer thickness adaption, adaption of effect flake orientation distribution, adaption of effectivity of solid color components, adaption of effectivity of effect color components or a combination thereof.

The paint color formulation calculation algorithm may be implemented on the computer processor calculating the application adaption parameters or may be implemented on a further computer processor. In case the paint color formulation calculation algorithm is implemented on a further computer processor, the calculated application adaption parameters, the specific optical data of individual color components as well as the target color are provided via a communication interface to the further computer processor. The paint color formulation calculation algorithm is realized by a numerical method and a physical model. The numerical method is configured to optimize concentrations of individual color components of a preliminary color formulation in relation to the target color by minimizing a given cost function, starting from a given initial color formulation, the given cost function being particularly chosen as a color distance between the received target color and a predicted color of the preliminary color formulation, and the physical model is configured to predict the color of the preliminary color formulation by using as input parameters concentrations of the individual color components used in the preliminary color formulation, specific optical data of the individual color components used in the color formulation and the calculated application adaption parameters, and wherein the optimized concentrations of the color components are calculated by comparing the recursively predicted color of the preliminary color formulation with the target color until the given cost function falls below a given threshold.

Providing the calculated modified representation via a communication interface may include displaying the modified representation, such as the modified color formulation or mixing formula, via a graphical user interface. The user may then use the displayed information to prepare a modified coating composition based on the displayed information and may apply the modified coating composition to the substrate using "his" or "her" personal application parameters, i.e. the sensor data acquired in step (iii). The calculated modified representation may be interrelated with the sensor data acquired in step (iii) and may be stored in a database. This allows to quickly retrieve the modified representation in case it is required again and renders recalculation superfluous.

Step (xiii) thus allows to adapt the modified or new representation, such as a mixing formula, to the personal application parameters, i.e. the sprayer is not forced to use standard application parameters to obtain the desired optical result but can use the inventive method to adapt the modified or new representation, such as a mixing formula, to his personal application parameters. This renders adaption of the sprayer to standard application parameters superfluous, thus allowing an efficient refinish process because the sprayer can apply the coating composition as accustomed and does not have to adhere to the standard parameters in order to obtain an acceptable optical result.

Embodiments of the Inventive System

In an aspect, means for providing the modified or new representation of the coating composition include at least one database comprising existing representations. The existing representation is then modified as described previously. In an alternative aspect, means for providing the new representation of the coating composition may include providing an application or tool which can be used to develop a new representation, such as a mixing formula or recipe. In one example, the application or tool may comprise a simulation or prediction function which can predict whether the developed representation provides the desired surface properties to support the development. In another example, the application or tool can provide a newly developed mixing formula based on provided data, such as surface property data, previously acquired sensor data, etc. . . . Such applications or tools are commonly known in the state of the art and may include the use of trained neural networks. This allows to adapt the mixing formula to the finisher's way of working, thus reducing the time the finisher has to spend adapting his way of working to achieve standard application parameters.

In an aspect, means for providing surface property data of at least one produced coating layer may include measurement devices to measure the color and/or sparkling and/or texture (i.e. coarseness or graininess), gloss measurement devices, surface roughness measurement devices, surface hardness measurement devices or a combination thereof. In another aspect, means for providing surface property data of at least one produced coating layer may comprise a display, in particular a display comprising a graphical user interface. This may be preferred, if surface property data is provided by visual inspection and the obtained data is entered on the display, in particular by using the GUI contained on the display.

In an aspect, means for determining at least one quality parameter of the provided modified or new representation of the coating composition may include a processing module comprising at least one computer processor and a memory storing instructions that, when executed by the processing module, configure the system to perform the steps of providing to the computer processor via the communication interface at least part of the sensor acquired sensor data;

providing to the computer processor via the communication interface surface property data of at least one produced coating layer;

determining with the computer processor at least one quality parameter of at least one modified or new representation based on the provided sensor data and the provided surface property data; and providing via the communication interface the at least one determined quality parameter.

The processing module may include a microprocessor, a microcontroller, a field programmable gate array (FPGA), a central processing unit (CPU) or a digital signal processor (DSP) capable of receiving data, e.g. via the at least one communication interface.

In some aspects of the present invention, the method and/or system provide a user interface and workflow that enables users to visualize and analyze the acquired sensor data and determined quality of the representation. The system may include a computing device that presents a user interface (e.g. a GUI) to a user. The user interface may be presented via a web page or via a dedicated application running on a client machine.

The system architecture may include a server machine connected to client machines via a network. The client machines may be embodiments of the means for determining at least one quality control parameter as previously disclosed. The network may be a public network (e.g., the Internet), a private network or wide area network (WAN)), or a combination thereof. The client machines may run an operating system that manages hardware and software of the client machines. A browser may run on the client machines. The browser may be a web browser that can access content served by a web server. The browser may issue web page requests, search queries and/or other commands to the web server. Additionally, an application designed to communicate with web server may run on some of the client machines.

Further embodiments or aspects are set forth in the following numbered clauses:

1. A process for determining a quality parameter of a representation of a coating composition, said method comprising the steps of:
   (i) providing a modified or new representation of a coating composition;
   (ii) preparing the coating composition from the provided representation;
   (iii) producing a coating layer on at least a part of a substrate by manually applying the coating composition prepared in step (ii) with a spray gun comprising a sensor unit, a processing unit and optionally a signal unit to at least part of the substrate while acquiring sensor data with the sensor unit;
   (iv) optionally providing feedback to a user via the signal unit during manual application of the coating composition based on the sensor data acquired in step (iii);
   (v) optionally repeating steps (i) to (iii) or steps (i) to (iv);
   (vi) providing to a computer processor via a communication interface at least a part of the sensor data acquired in step (iii);
   (vii) providing to the computer processor via the communication interface surface property data of at least one coating layer produced in step (iii);
   (viii) determining with the computer processor at least one quality parameter of at least one representation provided in step (i) based on
      the sensor data provided in step (vi), and
      the surface property data provided in step (vii);
   (ix) providing via the communication interface the at least one quality parameter determined in step (viii); and
   (x) providing the representation of the coating composition via the communication interface to at least one database if the quality of said representation is determined in step (viii) to be acceptable.
2. The process according to clause 1, wherein providing a modified representation includes changing at least one parameter described in a provided existing representation
3. The process according to clause 2, wherein the existing representation is present in physical form or digital form, in particular in digital form.
4. The process according to clause 3, wherein the physical form includes paper or color chips.
5. The process according to clause 3 or 4, wherein the digital form includes a computer readable medium, in particular a database.
6. The process according to any one of clauses 3 to 5, wherein providing the existing representation includes providing vehicle identification or surface property data, obtaining existing representation(s) based on the provided vehicle identification or surface property data, and providing said obtained representation(s).
7. The process according to clause 6, wherein the step of obtaining the existing representation(s) is further defined as searching a database for said representations(s) based on the provided vehicle identification or surface property data.
8. The process according to any one of the proceeding clauses, wherein providing a new representation includes defining parameters without using an existing representation as a basis.
9. The process according to any one of the proceeding clauses, wherein providing the modified or new representation of the coating composition may include providing a modified or new mixing formula or a modified or new recipe, in particular a modified or new mixing formula.
10. The process according to any one of the proceeding clauses, wherein the coating composition is prepared in step (ii) by mixing components according to the modified or new representation provided in step (i).
11. The process according to clause 10, wherein the components are contents of containers or raw materials, in particular contents of containers.
12. The process according to clause 10 or 11, wherein the contents of the containers are selected from a tinting base, an unpigmented base, a reducer base or a hardener composition.
13. The process according to any one of the proceeding clauses, wherein the prepared coating composition is a liquid coating composition or a powder coating composition, in particular a liquid coating composition.

14. The process according to any one of the proceeding clauses, wherein the substrate is selected from metallic substrates, plastic substrates, substrates comprising metallic and plastic parts, metallic or plastic substrates comprising at least one coating layer or metallic or plastic substrates comprising at least one coating layer having defective site(s), in particular metallic or plastic substrates comprising at least one coating layer having defective site(s).
15. The process according to any one of the proceeding clauses, wherein the coating layer produced in step (iii) is a pigmented coating layer or a clearcoat layer.
16. The process according to any one of the proceeding clauses, wherein the spray gun is a pneumatic or electrostatic spray gun, in particular a pneumatic spray gun.
17. The process according to any one of the proceeding clauses, wherein the sensor unit, the processing unit and optionally the signal unit are configured as a single unit.
18. The process according to any one of clauses 1 to 16, wherein at least one of the sensor unit, the processing unit and optionally the signal unit is configured as a separate unit.
19. The process according to any one of the proceeding clauses, wherein the sensor unit, the processing unit and optionally the signal unit or the single unit is permanently attached to the spray gun or is detachable, in particular detachable.
20. The process according to any one of the proceeding clauses, wherein the sensor unit includes at least one sensor.
21. The process according to clause 20, wherein the at least one sensor is selected from distance sensors, orientation sensors, acceleration sensors, LiDAR sensors, pressure sensors, paint flow rate sensors, temperature sensors, humidity sensors and combinations thereof, in particular from orientation and acceleration sensors or from orientation, acceleration and distance sensors.
22. The process according to clause 21, wherein the distance sensors are selected from ultrasonic sensors, LiDAR sensors, radar sensors or a combination thereof.
23. The process according to any one of the proceeding clauses, wherein the processing unit of the spray gun comprises a microcontroller or microprocessor.
24. The process according to any one of the proceeding clauses, wherein the signal unit provides at least one optic and/or acoustic and/or haptic signal.
25. The process according to any one of the proceeding clauses, wherein the sensor data acquired in step (iii) is selected from data on the distance between the spray gun and the substrate, data on the orientation of the spray gun with respect to the substrate, data on the movement of the spray gun, data on the contour of the substrate, data on the pressure of the compressed air, data on the flow of the coating composition, temperature data, humidity data and combinations thereof.
26. The process according to any one of the proceeding clauses, wherein providing feedback to a user during manual application of the coating composition with the spray gun in step (iv) includes
    providing the sensor data acquired in step (iii) via a communication interface to the processing unit of the spray gun,
    processing with the processing unit the provided sensor data to determine whether the provided data is within or outside at least one predefined value, in particular at least one predefined parameter and/or tolerance, and
    providing with the signal unit at least one signal to the user in response to the processed sensor data.
27. The process according to clause 26, wherein the at least one predefined value is selected from distance value(s), orientation value(s), movement value(s), pressure value(s), flow value(s), temperature value(s), humidity value(s) and combinations thereof.
28. The process according to clause 26 or 27, wherein the at least one signal is selected from optic signals, acoustic signals, haptic signals or a combination thereof.
29. The process according to any one of the proceeding clauses, wherein the communication interface of step (vi) includes Bluetooth or WiFi.
30. The process according to any one of the proceeding clauses, wherein the sensor data is provided in step (vi) via the communication interface to a mobile communication apparatus, a personal computer, a laptop or a computer kiosk.
31. The process according to any one of the proceeding clauses, wherein providing surface property data in step (vii) includes determining surface property data of at least one coating layer applied in step (iii) and providing the determined surface property data to the computer processor via the communication interface.
32. The process according to clause 31, wherein the surface property data is determined by visual inspection or by measuring the surface property with a measuring device.
33. The process according to any one of the proceeding clauses, wherein surface property data is selected from color data, appearance data, gloss data, thickness data, roughness data, hardness data and combinations thereof, in particular color data and/or appearance data.
34. The process according to any one of the proceeding clauses, wherein determining the quality of the provided modified or new representation of the coating composition in step (viii) includes
    providing at least one predefined application value, in particular at least one predefined application parameter and/or tolerance, and at least one predefined surface property value, in particular at least one predefined surface property parameter and/or tolerance, via a communication interface to the computer processor and
    determining with the computer processor if the sensor data provided in step (vi) is within at least one predefined application value, and if the surface property data provided in step (vii) is within at least one predefined surface property value.
35. The process according to clause 34, wherein providing the predefined application value(s) and/or the predefined surface property value(s) includes providing an existing representation, obtaining the predefined application value(s) and/or the predefined surface property value(s) based on the provided representation and providing the obtained the predefined application value(s) and/or the predefined surface property value(s).
36. The process according to clause 35, wherein the step of obtaining the predefined application value(s) and/or the predefined surface property value(s) includes retrieving said value(s) from a database based on the provided representation.

37. The process according to any one of clauses 34 to 36, wherein the predefined value(s) include numerical value(s) or range(s) of numerical value(s) for the data provided in steps (vi) and (vii).
38. The process according to any one of clauses 34 to 37, wherein the at least one predefined application value is selected from a distance tolerance, an orientation tolerance, a movement tolerance, a pressure tolerance, a flow tolerance, a temperature tolerance, a humidity tolerance or a combination thereof.
39. The process according to any one of clauses 34 to 38, wherein the at least one predefined surface property value includes a predefined color difference, a predefined appearance difference, a predefined gloss difference, a predefined thickness difference, a predefined roughness difference, a predefined hardness difference and combinations thereof.
40. The process according to any one of the proceeding clauses, wherein the quality parameter is a classifier being indicative of the acceptability of the provided modified or new representation of the coating composition.
41. The process according to clause 40, wherein the quality of the provided representation of the coating composition is acceptable if the sensor data provided in step (vi) is within at least one predefined application value and if the surface property data provided in step (vii) is within at least one predefined surface property value, in particular within a set of predefined application and surface property values.
42. The process according to any one of the proceeding clauses, wherein the communication interface in step (vii) and/or (viii) comprises a display, preferably a display having a graphical user interface.
43. The process according to any one of the proceeding clauses, further including the steps of
    (xi) analyzing with the computer processor sensor data provided in step (vi); and/or
    (xii) optionally providing recommendations via the communication interface if the sensor data provided in step (vi) and/or the surface property data provided in step (vii) is outside of predefined value(s); and/or
    (xiii) generating a further representation if the sensor data provided in step (vi) and/or the surface property data provided in step (vii) is outside of at least one predefined value.
44. The process according to clause 43, wherein analyzing the provided sensor data includes analyzing the movement, in particular movement patterns, of the user during application of the coating composition with the spray gun and optionally providing the result of the analysis via a communication interface, in particular via a communication interface comprising a display, to the user.
45. The process according to clause 43, wherein analyzing the provided sensor data includes analyzing the temperature and/or humidity and/or pressure and/or paint flow data and optionally providing the result of the analysis via a communication interface, in particular via a communication interface comprising a display, to the user.
46. The process according to any one of clauses 43 to 45, wherein generating a further representation if the sensor data provided in step (vi) and/or the surface property data provided in step (vii) is outside of at least one predefined value includes
    optionally providing the modified or new representation of step (i) and surface property data of step (vii) via a communication interface to a computer processor,
    providing via a communication interface to a computer processor a target color of a coating layer,
    optionally retrieving with the computer processor via the communication interface from a database specific optical data of individual color components associated with the representation provided in step (i),
    providing via the communication interface to the computer processor a numerical method and a physical model, wherein the numerical method is configured to optimize application adaption parameters by minimizing a given cost function starting from a given set of initial application adaption parameters, the given cost function being particularly chosen as a color difference between the provided surface property data and predicted surface property data of the provided representation, and the physical model is configured to predict the color of the provided representation by using as input parameters the color formulation associated with the provided representation and the retrieved specific optical data of the individual color components and respective preliminary application adaption parameters resulting in the course of optimization,
    calculating with the computer processor application adaption parameters using the provided numerical method and the physical model by comparing the recursively predicted color of the provided representation with the provided surface property data until the given cost function falls below a given threshold,
    calculating using the provided target color and calculated application adaption parameters as input parameters for the paint color formulation calculation algorithm, a modified representation with optimized concentrations of individual color components as target color formulation for a target paint coating when the target paint coating is applied on a substrate using the sensor data acquired in step (iii), and
    providing the further representation via a communication interface.
47. The process according to any one of the preceding clauses, wherein providing the modified or new representation of the coating composition via the communication interface to at least one database in step (x) includes inputting or importing the provided modified or new representation of the coating composition into the database.
48. A system for determining a quality parameter of a representation of a coating composition, said system including:
    a) means for providing at least one modified or new representation of the coating composition;
    b) a spray gun for manually applying the coating composition to a substrate, the spray gun comprising a sensor unit for acquiring sensor data during operation of the spray gun, a processing unit for processing the acquired sensor data and optionally a signal unit for providing at least one signal in response to the processed sensor data:
    c) at least one communication interface;

d) means for providing surface property data of at least one coating layer produced from the provided representation of the coating formulation;

e) means for determining at least one quality parameter of the provided modified or new representation of the coating composition.

49. The system according to clause 48, wherein the means for providing the modified or new representation of the coating composition include at least one database, in particular comprising existing representations.

50. The system according to clause 48 or 49, wherein the means for providing surface property data of at least one produced coating layer include measurement devices to measure the color and/or sparkling and/or texture, gloss measurement devices, surface roughness measurement devices, surface hardness measurement devices or a combination thereof or a display.

51. The system according to any one of clauses 48 to 50, wherein the means for determining at least one quality parameter of an adapted representation of the coating composition include a processing module comprising at least one computer processor and a memory storing instructions that, when executed by the processing module, configure the system to perform the steps of providing to the computer processor via the communication interface at least part of the sensor acquired sensor data;

providing to the computer processor via the communication interface surface property data of at least one produced coating layer;

determining with the computer processor at least one quality parameter of at least one modified or new representation based on the provided sensor data and the provided surface property data; and providing via the communication interface the at least one determined quality parameter.

52. Use of the method according to any one of the clauses 1 to 47 for screening modified or new representations of coating compositions according to a quality criterion.

53. System comprising a) a modified or new representation of a coating composition, and b) a quality parameter, wherein the quality parameter is determined according to the method of any one of the clause 1 to 47.

54. A database comprising at least one modified or new representation of a coating composition, wherein the modified or new representation of the coating composition is provided to the database according to the method of any one of clauses 1 to 47.

BRIEF DESCRIPTION OF THE DRAWINGS

These and other features of the present invention are more fully set forth in the following description of exemplary embodiments of the invention. To easily identify the discussion of any particular element or act, the most significant digit or digits in a reference number refer to the figure number in which that element is first introduced. The description is presented with reference to the accompanying drawings in which.

DETAILED DESCRIPTION

The detailed description set forth below is intended as a description of various aspects of the subject-matter and is not intended to represent the only configurations in which the subject-matter may be practiced. The appended drawings are incorporated herein and constitute a part of the detailed description. The detailed description includes specific details for the purpose of providing a thorough understanding of the subject-matter. However, it will be apparent to those skilled in the art that the subject-matter may be practiced without these specific details.

Figure 1:
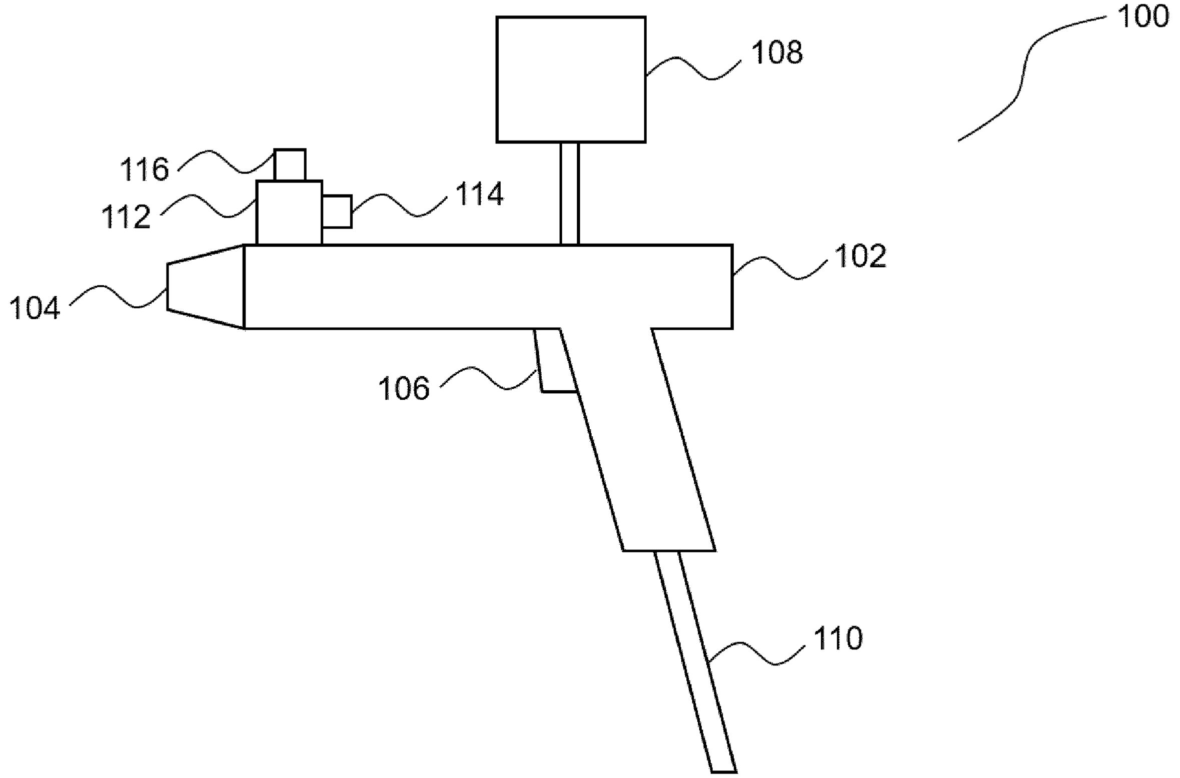
FIG. 1 illustrates a spray gun comprising a sensor unit, a processing unit and a signal unit which is used in the inventive method

FIG. 1 depicts a schematic illustration of a spray gun 100 operable to manually apply a coating composition to a substrate. In this example, the spray gun 100 is a pneumatic spray gun operably to apply a liquid coating composition to the substrate. In another example, the spray gun 100 may be an electrostatic spray gun. In yet another example, the coating composition may be a powder coating composition. The spray gun 100 comprises a body 102 having a spray nozzle 104. Connected to the body is a trigger 106, a reservoir 108 comprising the coating composition and means 110 to deliver the coating composition to the substrate. In this example, reservoir 108 is shown as a single item for the sake of simplicity. In another example, the spray gun 100 may typically be configured so as to be provided with separate reservoirs 108.1 to 108.*n* and means 110.1 to 110.*n* to deliver the coating compositions being present in the reservoirs 108.1 to 108.*n*. In this example, the means 110 is compressed air. In another example, the means 110 is a combination of compressed air and electricity. When the trigger 106 is pressed by an operator, such as a painter in a repair shop, the coating composition being present in reservoir 108 is applied to the substrate by means 110. The spray gun 100 further comprises a sensor unit 112, a processing unit 114 and a signal unit 116. In this example, the processing unit 114 is a microprocessor. In this example, the sensor unit 112, the processing unit 114 and the signal unit 116 are configure as a single unit being attached to the body 102 of the spray gun 100. In another example, the processing unit 114 and/or the signal unit 116 may be attached separately from the sensor unit 112 to the body 102 of the spray gun 100.

Figure 2A:
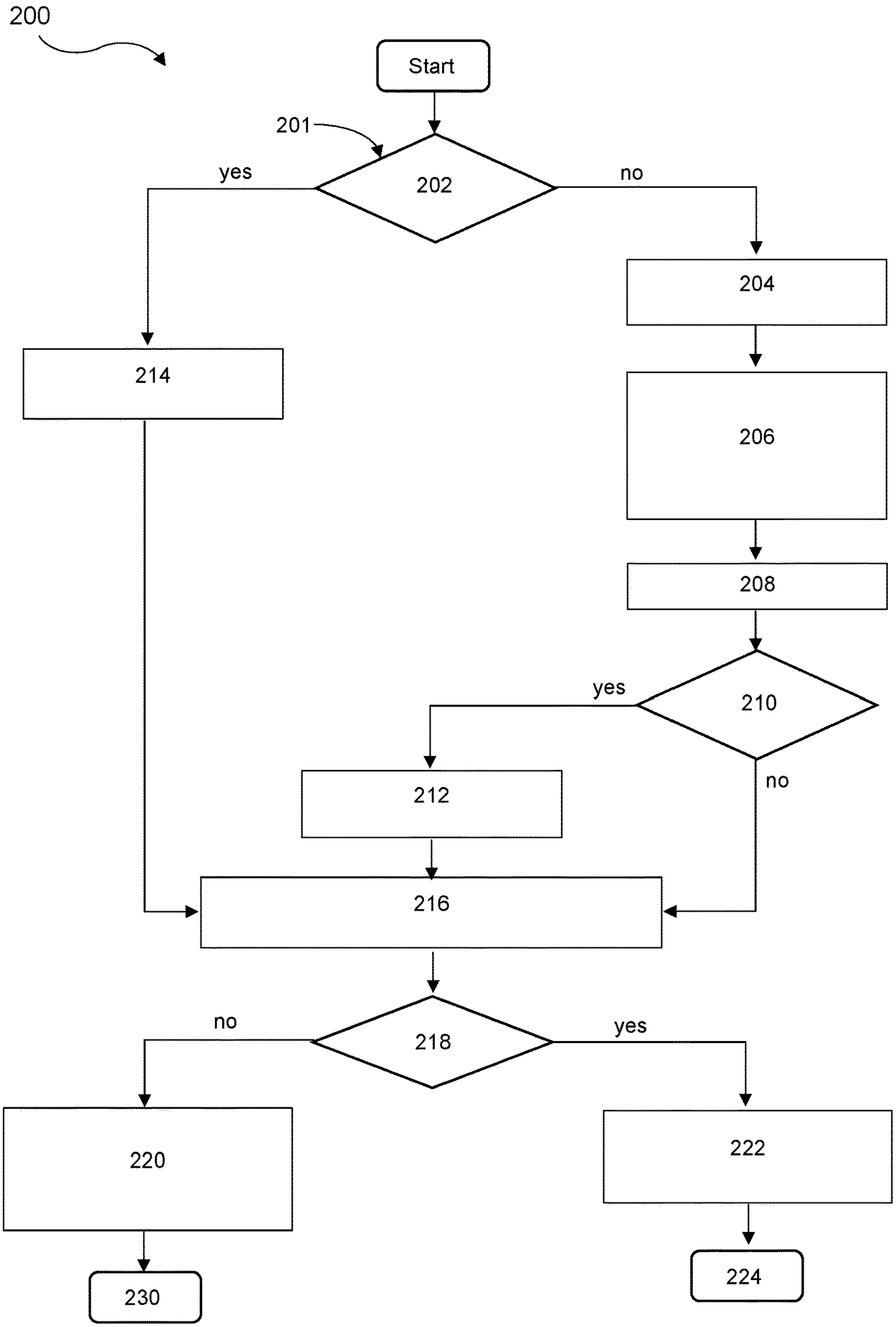
FIG. 2*a* is a block diagram of a method for determining a quality parameter of a representation of a coating composition, such as a mixing formula
Figure 2A:
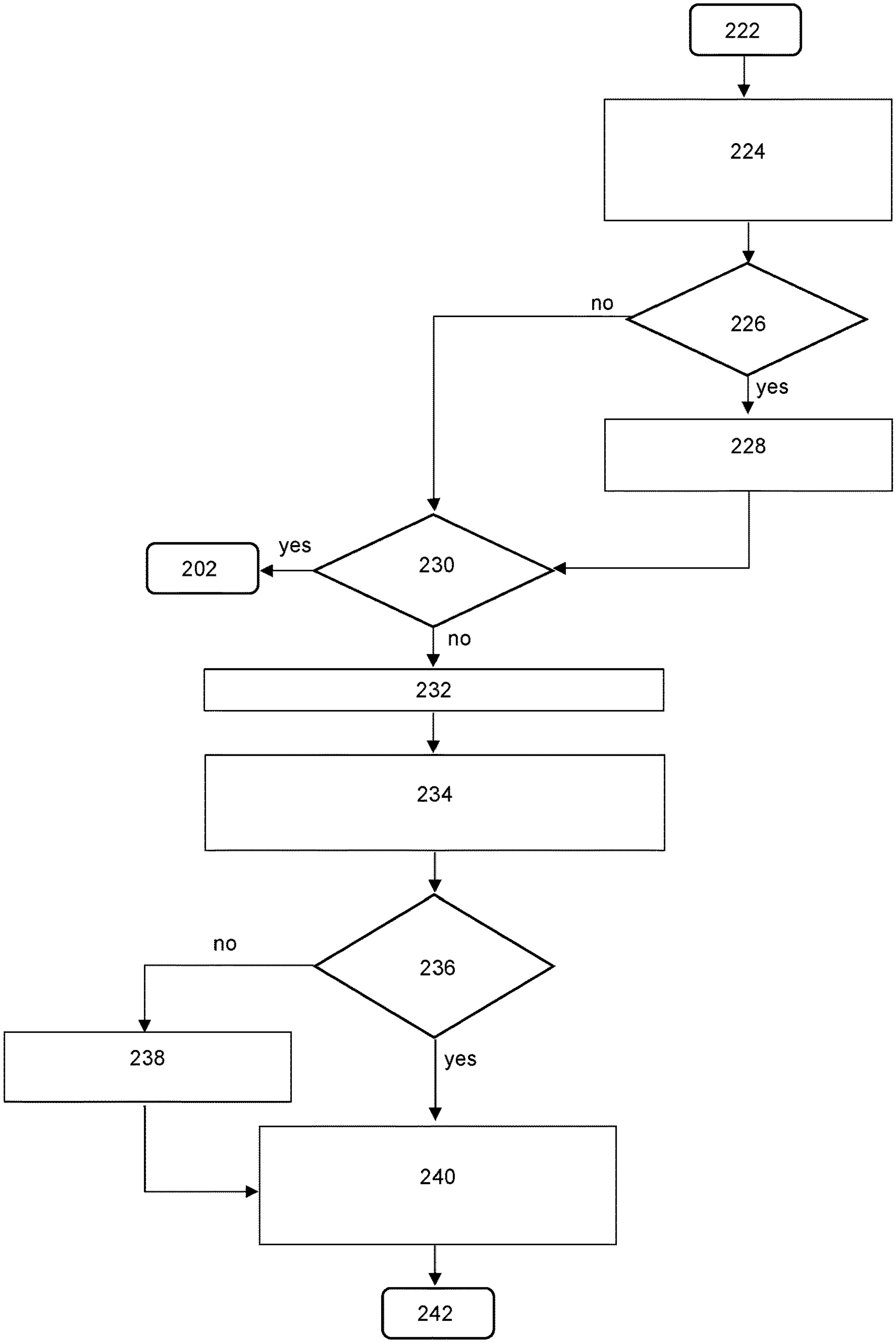
Figure 2A:
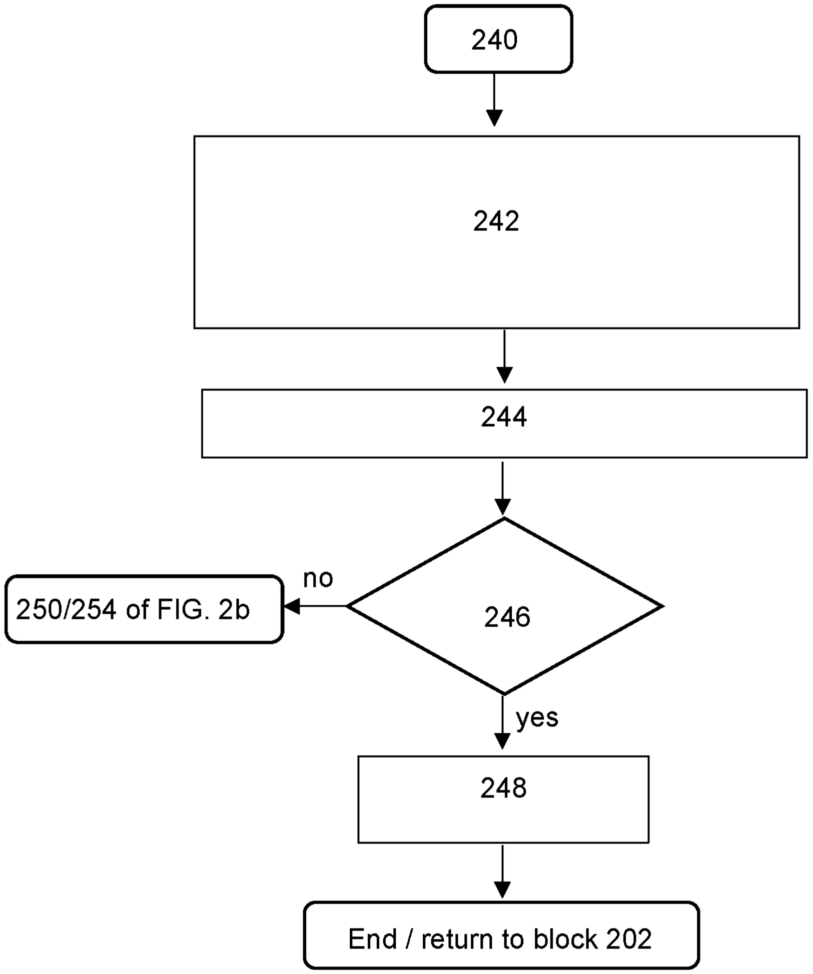

FIG. 2*a* depicts a non-limiting first embodiment of the inventive method 200 of determining the quality of a representation of a coating composition. In this example, a refinish basecoat composition and a refinish clearcoat composition are prepared and are applied subsequently onto a defective area of a multilayer coating of an automotive after sanding and optionally further pretreatment of the defective area.

In block 202, routine 201 determines whether the user wants to develop a new mixing formula, such as a new mixing formula for a refinish basecoat composition. For this purpose, routine 201 may display a menu on a GUI of a display device prompting the user to make the appropriate selection. The display device may be connected to personal computer comprising a computer processor or may be included in a mobile device, such as a smartphone, tablet or laptop, comprising a computer processor. In case the user wants to develop a new mixing formula, routine 201 may display recommendations on the screen which support the user in the development or may initiate an application or tool designed to develop new mixing formulae as described later on. Method 200 then proceeds to block 214 described later on. In case the user does not want to develop a new mixing formula, routine 201 proceeds to block 204.

In block 204, the user needs to provide properties of a multilayer coating, such as the color and/or appearance, the VIN, a color code, a mixing formula used to prepare a refinish basecoat composition etc. . . . For this purpose, routine 201 may display a menu on a GUI of the display device containing available options for retrieving existing mixing formulae of refinish basecoat compositions. Depending on the user selection, routine 201 may display further menus guiding the user through the data entry process necessary to retrieve the mixing formula as described in relation to block 206. The color and/or appearance of the multilayer coating may be provided by measuring the color and/or appearance of the multilayer coating of the automotive at undamaged site(s) with a commercially available spectrophotometer or by inputting color values associated with the multilayer coating. The acquired data may either be processed by the spectrophotometer or the computer processor. The processed data or the acquired raw data is provided to a computer processor via a communication interface, such as a USB cable or a wireless communication interface. The color code can be provided by visually comparing color chips with the undamaged multilayer coating and entering the color code associated with the best matching color chip.

In block 206, the properties provided in block 204 are used to retrieve suitable existing mixing formulae from a database connected via a communication interface, such as the internet, to the computer. The database contains existing mixing formulae associated with properties, such as the color and/or appearance, the VIN, the color code, mixing formula for matching clearcoats/basecoats or a combination thereof. In one example, a refinish clearcoat composition is selected upon repeating blocks 202 to 208 from a database based on the properties of the refinish basecoat composition provided in the first run of blocks 202 to 208. For this purpose, routine 201 may use the mixing formula selected in block 208 to retrieve suitable refinish clearcoat compositions from the database based on the selected mixing formula. In another example, routine 201 may display on the screen of the display device a list of available refinish clearcoat compositions.

In block 208, the user selects an appropriate mixing formula from the existing mixing formulae retrieved in block 206 and the selected mixing formula is displayed on the screen of the display device. Displaying the selected mixing formulae may include displaying further data, for example comments, rankings, a price, etc. which may be retrieved from a database based on the mixing formulae retrieved in block 206.

In block 210, routine 201 determines whether the user wants to modify the selected mixing formula. For this purpose, routine 201 may display a menu on a GUI of the display device prompting the user to make the appropriate selection. If the user wants to modify the selected mixing formula, method 200 proceeds to block 212. Otherwise, method 200 proceeds to block 216.

In block 212, the user modifies the selected mixing formula by changing the weight ratio of the tinting base, unpigmented base and reducer base listed in the mixing formula as desired. In one example, the modification of the existing representation may be performed after preparing a test panel and comparing the visual appearance of the test panel with the visual appearance of the coating at undamaged site(s). The modified mixing formula may be provided to the processor of the personal computer or mobile device, for example via a communication interface. This may be beneficial if an automated weighing apparatus is used in block 216 as described later on.

In block 214, the user develops a new mixing formula. This may include defining parameters, such as amounts, ratios, production parameters, etc. without using an existing mixing formula as a basis. Development of a new mixing formula may be performed using an application or tool. In one example, the application or tool may comprise a simulation or prediction function which can predict whether the developed mixing formula provides the desired surface properties to support the development. In another example, the application or tool can provide a newly developed mixing formula based on provided data, such as surface property data. The newly developed mixing formula may be provided to the processor of the personal computer or mobile device, for example via a communication interface, in case the application or tool is not run on said personal computer or mobile device. This may be beneficial if an automatic weighing apparatus is used in block 216 as described in the following.

In block 216, the refinish basecoat composition is prepared from the mixing formula selected in block 208 or the modified mixing formula prepared in block 212 or the mixing formula newly developed in block 214, by mixing the tinting base, the unpigmented base and the reducer base in the amounts listed in the selected/modified/newly developed mixing formula and stirring the obtained coating composition. Mixing may be performed by transferring the mixing formula in digital form to an automated weighing apparatus which performs the weighing operation based on the transferred data and optionally stores the result of the weighing operation for further quality control checks. For this purpose, the weighing apparatus is connected via a communication interface to the computer processor previously described.

In block 218, routine 201 determines whether the user wants to receive feedback from the sensor unit of the spray gun during application of the coating composition prepared in block 216. For this purpose, routine 201 may display a menu on a GUI of the display device prompting the user to make the appropriate selection. If routine 201 determines that the user wants to receive feedback during the application process, routine 201 proceeds to block 222. Otherwise, method 200 proceeds to block 220.

In block 220, a coating layer is produced on the defective sites of the multilayer coating by manually applying the coating composition prepared in block 216 with a spray gun comprising a sensor unit, a processing unit and a signal unit to the defective site while acquiring sensor data with the sensor unit. The applied coating layer is afterwards dried and/or cured. A spray gun for manually applying the coating composition to the substrate and being suitable for use in block 220 is described, for example, in relation to FIG. 1. During manual application of the coating composition, sensor data is acquired with the sensor unit of the spray gun. The sensor data acquired during the manual application of the coating composition may be stored on the internal storage of the processing unit prior to providing the acquired sensor data to a further computer processor as described in relation to block 232.

In block 222, routine 201 provides to the processing unit of the spray gun predefined application values via a communication interface, such as Bluetooth or WiFi to the processing unit of the spray gun. In this example, the following values were provided: a distance value, i.e. tolerance for the distance between the spray gun and the substrate, and an orientation value, i.e. a tolerance for the orientation of the spray gun with respect to the substrate, a movement value and a pressure value, i.e. a tolerance for the pressure of the compressed air, a flow value, i.e. a tolerance for the flow of the basecoat composition, a temperature value and a humidity value. In another example, at least one of the aforementioned values is provided by routine 201 to the processing unit. In one example, the values provided by routine 201 to the processing unit are retrieved by routine 201 from a database based on the mixing formula selected in block 208. This may be preferred if a selected or modified mixing formula is used to prepare the coating composition in block 216. In another example, the user may input appropriate application values or may select appropriate application values from a list of available application values. Routine 201 detects the user input, converts the user input to the respective application values and provides the values via the communication interface to the processing unit of the spray gun. Routine 201 may be programmed to store the retrieved or converted values on the internal memory of the device for later use, such as described in relation to block 240 later on.

In block 224, a coating layer is manually produced on the defective sites of the multilayer coating by applying the coating composition prepared in block 216 with a spray gun as described in relation to block 220.

In block 226, the processor of the processing unit of the spray gun determines whether the sensor data acquired in block 224 is outside of at least one application value provided in block 222. In case the acquired sensor data is outside of at least one provided application value, block 228 is performed. Otherwise, method 200 proceeds to block 230.

In block 228, the processing unit controls the signal unit in response to the determination performed in block 226. Said signal unit provides at least one signal, for example by changing the color of the optical signal and/or changing the sound of the acoustic signal and/or changing the intensity of the haptic signal, in response to the control by the processing unit. This allows to provide feedback to the user of whether the application conditions used to manually apply the coating composition in block 224 are within predefined application values, thus ensuring that the coating composition is applied under standard application conditions to prevent a color mismatch due to the use of non-standard application conditions associated with the respective mixing formula. To provide feedback on the application conditions in real time to the user, blocks 224 to 228 are preferably performed simultaneously. "Simultaneously" refers to the time it takes the sensor unit to acquire the sensor data and the processing unit to process the sensor data (i.e. to determine whether the acquired data is within or outside of provided predefined application values) and to control the signal unit based on the processing result.

In block 230, routine 201 determines whether the user wants to apply a further coating composition. If this is the case, routine 201 proceeds to block 202, otherwise, routine 201 proceeds to block 232.

In block 232, the sensor data acquired in blocks 220 and/or 224 is provided to at least one computer processor via a communication interface. The sensor data includes the sensor data obtained during application of the basecoat composition in block 220 or 224 and the sensor data obtained during application of the clearcoat composition to the substrate upon repeating block 220 or 224. In this example, the computer processor is included in the personal computer, a laptop or a mobile communication device, such as a smartphone or tablet, described in relation to block 202. In another example, the sensor data is retrieved by routine 201 and provided via the communication interface to a cloud environment. The retrieved sensor data may be displayed on the screen of the display device.

In block 234, routine 201 retrieves surface property data of the prepared coating layer(s) and provides the retrieved data to the computer processor. In this example, surface property data is retrieved by routine 201 after the clearcoat layer applied in block 220 or 224 was cured. For this purpose, color data and/or appearance data and/or gloss data is obtained by measuring the color and/or appearance and/or the gloss of the prepared multilayer coating with a multi-angle spectrophotometer and/or a gloss meter. The spectrophotometer and/or gloss meter is each connected via a communication interface to the at least one processor and the acquired or preprocessed data is retrieved by routine 201 and provided to the at least one processor via said communication interface. The communication interface can be wireless, such as Bluetooth or WiFi, or wired, for example by use of a USB cable or ethernet.

In block 236, routine 201 determines whether the quality parameter is to be determined for each mixing formula associated with the coating composition applied in block(s) 220 or 224. Routine 201 may be programmed to proceed automatically to block 240 in case block 220 or 224 is only performed once, i.e. only one coating composition is applied to the substrate. In case at least 2 coating compositions were subsequently applied, i.e. block 220 or 224 was repeated at least twice, routine 201 may display a menu on a GUI of the display device prompting the user to make the appropriate selection. If routine 201 determines that the user wants to obtain the quality parameter for selected mixing formula(e), routine 201 proceeds to block 238. Otherwise, routine 201 proceeds to block 240 described later on.

In block 238, routine 201 detects a user input associated with selecting a mixing formula(s) from the list of mixing formula(e) used in block 216. For this purpose, routine 201 may display a list on a GUI of the display device comprising all mixing formula(e) used in block 216 and may detect the selection(s) made by the user. Routine 201 then proceeds to block 240.

In block 240, routine 201 retrieves predefined surface property value(s) and optionally predefined application value(s) and provides the retrieved value(s) to the processor. The predefined application values only need to be retrieved if block 222 was not performed or if the application values retrieved in block 222 were not stored on the internal memory of the device. In one example, the value(s) are retrieved by routine 201 from at least one database based on the mixing formula selected in block 208 or based on a mixing formula selected by the user from a list of available mixing formula. In another example, the value(s) is/are provided by the user via a GUI by manual input or by import from a file.

In block 242, a quality parameter for each mixing formula (e) or for each selected mixing formula(e) is determined with the processor based on the sensor data provided in block(s) 220 or 224 and the surface property data provided in block 234. The quality parameter is a classifier being indicative of the acceptability of the mixing formula modified in block 210 or newly developed in block 214. The quality parameter is obtained by determining whether the sensor data provided in block(s) 220 or 224 is within predefined application value(s) and the surface property data provided in block 234 is within predefined surface property value(s). The predefined application value(s) may include distance value(s), orientation value(s), movement value(s), pressure value(s), flow value(s), temperature value(s), humidity value(s) or any combination thereof. In this example, the predefined application values include distance value(s), orientation value(s) and movement value(s). The value(s) can be the same for the application of the basecoat composition and the clearcoat composition or can be different. In this example, the predefined surface property value(s) is/are predefined color tolerances, such as $\Delta L^*$, $\Delta C^*$, $\Delta h^*$ or $\Delta L^*$, $\Delta a^*$, $\Delta b^*$, predefined appearance value(s), predefined gloss value(s) and combinations thereof.

In block 244, the quality parameter(s) determined in block 240 is/are provided by routine 201 via the communication interface and are displayed on the screen of the display device. In this example, the quality parameter(s) is/are a classifier indicating the acceptability of the modified or newly developed mixing formula. In one example, the classifier can be "suitable quality" or "non-suitable quality". In this example, the provided sensor data, surface property data and the predefined value(s) used for the determination are also displayed to the user. In another example, only the determined quality parameter(s) is/are displayed. In one example, the displayed data may be colored to visualize deviations from the predefined value(s).

In block 246, routine 201 determines whether the quality of the mixing formula(e) is/are acceptable, i.e. whether acquired sensor data is within predefined application value(s) and whether the determined surface property data is within predefined surface property value(s). For this purpose, routine 201 may check the result of block 242 and proceeds to block 248 in case the quality of the modified/new mixing formulae is OK. Otherwise, routine 201 proceeds to block 254 described later on.

In block 248, the modified mixing formula generated in block 210 or the new mixing formula developed in block 214 is provided via the communication interface to at least one database. The database already contains existing representations, in particular existing mixing formulae, in connection with further information, such as color values, VIN etc. In this example, the modified/new mixing formula(e) is/are provided to the database by manual input or by importing the representation being stored on a computer readable medium. Apart from the mixing formula(e), further data, such as surface property data provided in block 234, comments, etc., may also be provided to the database and are stored in combination with the provided modified/new mixing formula(e). The user may get a notice stating that the modified or new representation has been provided to the database after manual input or import.

Figure 2B:
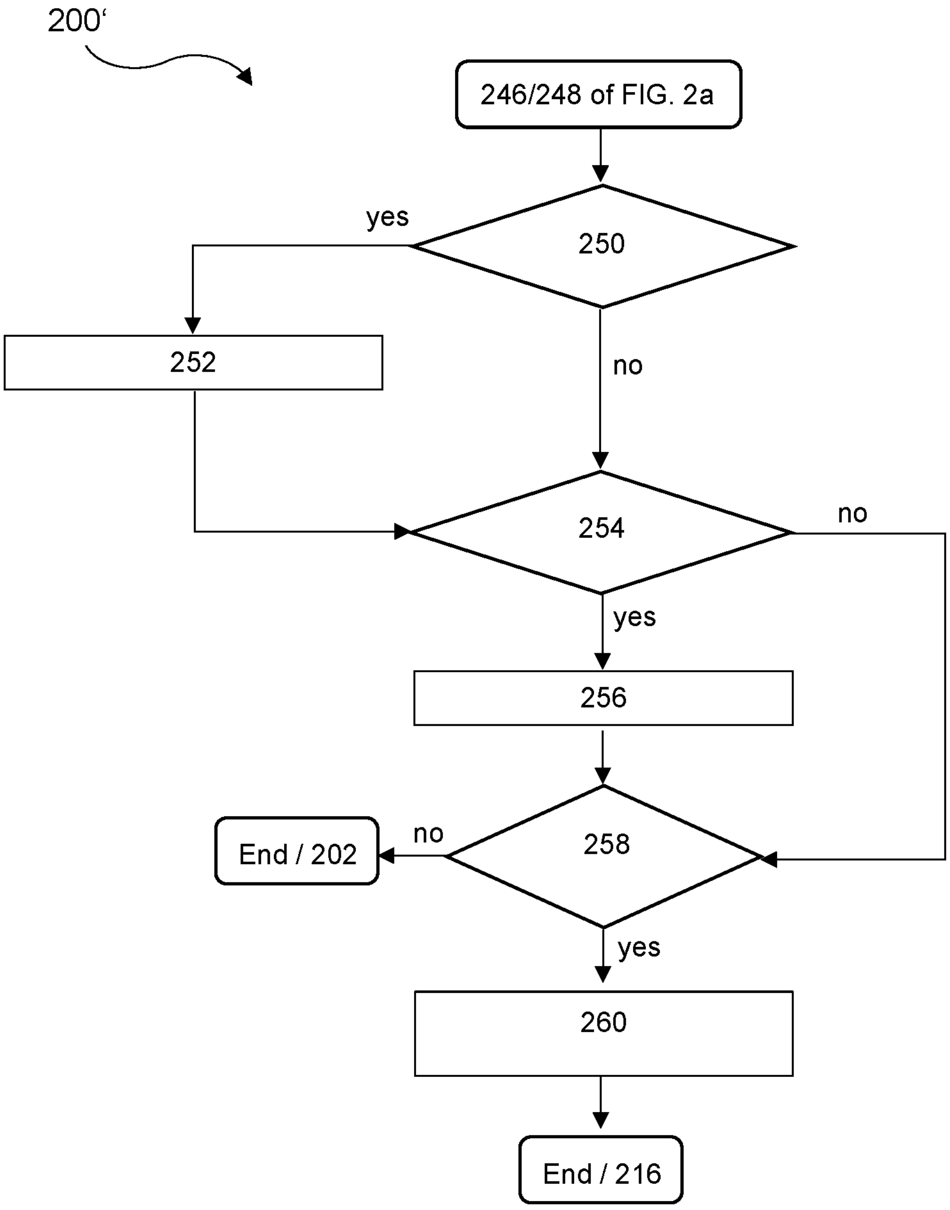
FIG. 2*b* is a block diagram of a preferred embodiment of the inventive method
Figure 3:
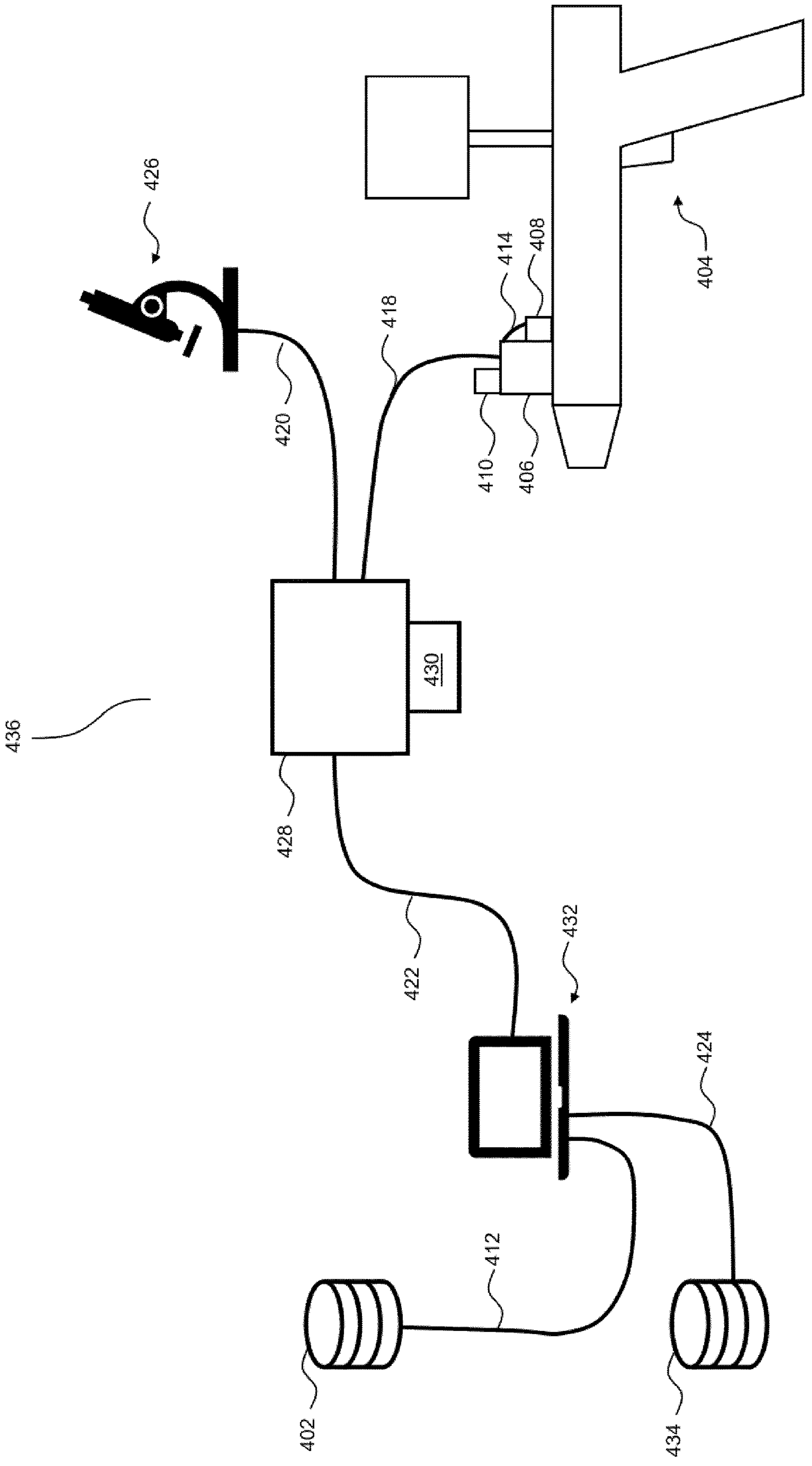
FIG. 3 illustrates a system in accordance with the invention

FIG. 2*b* depicts a second non-limiting embodiment of the inventive method 200' of determining the quality of a representation of a coating composition. In this example, a refinish basecoat composition and a refinish clearcoat composition are prepared and are applied subsequently onto a defective area of a multilayer coating of an automotive after sanding and optionally further pretreatment of the defective area.

Method 200' of comprises blocks 202 to 248 previously described in relation to FIG. 2*a*. Additionally, method 200' includes blocks 250 to 260 as described in the following. Method 200' may be performed if the user wants to analyze the sensor data provided in block 232 of FIG. 2*a* or if the user wants to generate modified mixing formula(e) based on his "personal application parameters" (i.e. the acquired sensor data) which provides a better match in terms of visual appearance than the mixing formulae used to prepare the coating composition in block 216 of FIG. 2*a*.

In block 250, routine 201' determines whether to analyze the provided sensor data. For this purpose, routine 201' may display a menu on a GUI of the display device prompting the user to make the appropriate selection. If routine 201' determines that the user wants to analyze the acquired sensor data, routine 201' proceeds to block 252. Otherwise, routine 201' proceeds to block 254 described later on.

In block 252, the sensor data provided in block 232 of FIG. 2*a* is analyzed with a computer processor. The processor may be included in a personal computer or laptop, a mobile communication device or a cloud application. In case the data is not yet available to the processor, routine 201' retrieves the data from the respective data storage medium and provides the data to the processor. The processor analyses the data gathered from the distance sensor, the orientation sensor and the movement sensor and the result of the analysis is displayed via a communication interface, preferably a display comprising a GUI, to the user. In one example, the displayed analysis includes movement patterns being displayed graphically to increase user comfort. In a further example, the displayed analysis further includes standard movement patterns to visualize any deviations. The standard movement patterns can be generated using the predefined application value(s) retrieved in block 222 or 240 of FIG. 2*a*. In yet another example, the displayed analysis includes graphical representations, such as bar charts, depicting the allowable range/value and the determined sensor data/surface property data.

In block 254, routine 201' determines whether to display at least one recommendation on the screen of the display device. For this purpose, routine 201' may check the result of block 246 or 242 or may display a GUI prompting the user to make the appropriate selection and proceeds to block 256 in case the at least one recommendation is to be displayed. Otherwise, routine 201' proceeds to block 258 described later on In block 256, routine 201' displays at least one recommendation on the screen of the display device. Routine 201' may retrieve the recommendations from a database based on the result of the determination performed in block 242 of FIG. 2*a* and provides the retrieved recommendation(s) to the processor. In one example, the recommendation may be in the form of a text message, such as "Distance of spray gun during application of coating material not ok. Repeat spraying process using the correct distance to obtain better results." In another example, the recommendation may be in the form of a graphical representation.

In block 258, routine 201' determines whether the user wants to modify the mixing formula(e) developed in block 214 of FIG. 2*a* or the modified mixing formula(e) generated in block 210 of FIG. 2 such that the desired surface properties are obtained. For this purpose, routine 201' may display a menu on a GUI of the display device prompting the user to make the appropriate selection. If routine 201' determines that the user wants to modify the mixing formula (e), routine 201' proceeds to block 260. Otherwise, routine 201' ends method 200' or proceeds to block 202 of FIG. 2*a*.

In block 260, a further modified mixing formula(e) is/are generated if the sensor data provided in block 232 of FIG. 2*a* and/or the surface property data provided in block 234 of FIG. 2*a* is/are outside of at least one predefined value, i.e. if the quality of the mixing formula developed in block 214 of FIG. 2*a* or the mixing formula modified in block 210 of FIG. 2*a* is determined to be not acceptable. The following method is used in block 260 to determine modified mixing formula (e):

- optionally providing the mixing formula(e) of block 210 or 214 of FIG. 2*a* and surface property data of block 234 of FIG. 2*a* via a communication interface to a computer processor,
- providing via a communication interface to a computer processor a target color of a coating layer,
- optionally retrieving with the computer processor via the communication interface from a database specific optical data of individual color components associated with the mixing formula(e) of block 210 or 214 of FIG. 2*a,*
- providing via the communication interface to the computer processor a numerical method and a physical model, wherein the numerical method is configured to optimize application adaption parameters by minimizing a given cost function starting from a given set of initial application adaption parameters, the given cost function being particularly chosen as a color difference between the provided surface property data and predicted surface property data of the mixing formula(e) of block 214 or 210 of FIG. 2*a*, and the physical model is configured to predict the color of the mixing formula(e) of block 214 or 210 of FIG. 2*a* by using as input parameters the color formulation associated with the mixing formula(e) of block 214 or 210 of FIG. 2*a* and the retrieved specific optical data of the individual color components and respective preliminary application adaption parameters resulting in the course of optimization, calculating with the computer processor application adaption parameters using the
- provided numerical method and the physical model by comparing the recursively predicted color of the mixing formula(e) of block 214 or 210 of FIG. 2*a* with the provided surface property data until the given cost function falls below a given threshold,
- calculating using the provided target color and calculated application adaption parameters as input parameters for the paint color formulation calculation algorithm, a modified representation with optimized concentrations of individual color components as target color formulation for a target paint coating when the target paint coating is applied on a substrate using the sensor data acquired in block(s) 222 or 224 of FIG. 2*a*, and
- providing the modified mixing formula(e) via a communication interface.

In this example, the generation of the modified mixing formula(e) is performed on further computer processor(s), i.e. computer processors being separate from the computer processor performing block 242 of FIG. 2*a*. These computer processor(s) may be located on a stationary computing device or in a cloud environment. The mixing formula(e) of blocks 210 or 214 of FIG. 2*a* as well as the surface property data provided in block 234 of FIG. 2*a* is provided to the computer processor(s) via a communication interface. In this example, data on the target color is determined in block 204 of FIG. 2*a*. In another example, the target color is retrieved by the computer processor(s) from database based on the mixing formula selected in block 208 of FIG. 2*a*

In this example specific optical data of individual color components is retrieved from a database with the processor(s) based on the mixing formula(e) of blocks 214 or 210 of FIG. 2*a*. In another example, this data is stored on a data storage medium, such as an internal storage.

The numerical method and physical model used for calculation of the application adaption parameters previously described as well as the paint color formulation calculation algorithm previously described is either implemented on the computer processor(s) or is retrieved from a database.

In this example, the calculated modified representation is displayed on the screen of a display device such that the user can prepared a modified coating composition based on the displayed information. The calculated modified representation may be interrelated with the sensor data acquired in block 220 or 224 of FIG. 2*a* and may be stored in a database.

FIG. 4 shows an example of a system 436 for determining a quality parameter of a representation of a coating composition comprising:

- means for providing at least one representation of the coating composition 402; a spray gun 404 for manually applying the coating composition to a substrate, the spray gun 404 comprising a sensor unit 406 for acquiring sensor data during operation of the spray gun, a processing unit 408 for processing the acquired sensor data and a signal unit 410 for providing at least one signal in response to the processed sensor data; a communication interface 412, 414, 416, 418, 420, 422, 424; means for providing surface property data of at least one produced coating layer 426; a computer processor 428 and a memory 430 storing instructions, that when executed by the processor, configure the system to perform the steps of:
  - providing to the computer processor via the communication interface at least part of the sensor acquired sensor data;
  - providing to the computer processor via the communication interface surface property data of at least one produced coating layer;
  - determining with the computer processor at least one quality parameter of at least one representation based on the provided sensor data and the provided surface property data; and
  - providing via the communication interface the at least one determined quality parameter.

In this example the system further comprises an input/output device 432. In this example, existing representations of coating compositions are stored in database 402. The existing representations are mixing formulas for preparing refinish basecoat and clearcoat compositions. The database is connected via communication interface 412 with the input/output device 430. The user retrieves an existing representation for preparing a basecoat composition via input/output device 430 from database 402 and modifies this representation, for example by changing the weight ratio of the components listed in the mixing formula. The modified mixing formula is stored by the user on a computer readable storage medium. The storage medium can be a memory of the input/output device or a database or a cloud application connected via a communication interface to the input/output device. The coating composition is prepared from the modified mixing formula and is manually applied on the substrate with spray gun 404 while acquiring sensor data with sensor unit 406. In this example, feedback is provided to the user during manual application of the coating composition by providing the acquired sensor data to processing unit 408 of the spray gun via communication interface 414. The processing unit 408 determines whether the acquired sensor data is within predefined value(s) and controls signal unit 410, which provides optic, acoustic or haptic signals in response to the control by the processing unit. The predefined value(s) are provided by input/output device 432 via communication interface 416 to the processing unit 408 prior to application of the coating composition to the substrate. The sensor data acquired during manual application of the coating composition is provided to processor 428 via communication interface 418. In this example, means for providing surface property data 426 include a multi-angle spectrophotometer and/or a gloss meter. The multi-angle spectrophotometer and/or gloss meter are connected via communication interface 420 to computer processor 428. The input/output device 432 is used to provide application value(s) and surface property value(s) to the processor 428 via communication interface 422. The application value(s) and surface property value(s) are stored in database 434, which is connected via communication interface 424 to input/output device 432. With the computer processor 428, the quality parameter, in this example the suitability of the modified representation(s) with respect to achieving the desired surface properties, such as color and/or appearance and/or gloss, are determined based on the sensor data provided via communication interface 418, the surface property data provided via communication interface 420 and the value(s) provided from database 434 via communication interface 424. In this example the determined quality parameter is provided to the input/output device 432 via communication interface 422. If the quality of the adapted representation(s) is acceptable, the adapted representations are provided via input/output device 432 and communication interface 412 to database 402.

The invention claimed is:

1. A process for determining a quality parameter of a representation of a coating composition, said method comprising the steps of:

(i) providing a modified or new representation of a coating composition;

(ii) preparing the coating composition from the provided modified or new representation;

(iii) producing a coating layer on at least a part of a substrate by manually applying the coating composition prepared in step (ii) with a spray gun comprising a sensor unit, a processing unit and optionally a signal unit to at least part of the substrate while acquiring sensor data with the sensor unit;

(iv) optionally providing feedback to a user via the signal unit during manual application of the coating composition based on the sensor data acquired in step (iii);

(v) optionally repeating steps (i) to (iii) or steps (i) to (iv);

(vi) providing to a computer processor via a communication interface at least a part of the sensor data acquired in step (iii);

(vii) providing to the computer processor via the communication interface surface property data of at least one coating layer produced in step (iii) by determining the surface property data of at least one coating layer applied in step (iii) and providing the determined surface property data to the computer processor via the communication interface;

(viii) determining with the computer processor at least one quality parameter of at least one representation provided in step (i) based on the sensor data provided in step (vi), and the surface property data provided in step (vii);

(ix) providing via the communication interface the at least one quality parameter determined in step (viii); and (x) providing the representation of the coating composition via the communication interface to at least one database if the quality of said representation is determined in step (viii) to be acceptable.

2. The process according to claim 1, wherein providing the modified or new representation of the coating composition may include providing a modified or new mixing formula or a modified or new recipe.

3. The process according to claim 1, wherein the sensor unit includes at least one sensor.

4. The process according to claim 3, wherein the at least one sensor is selected from the group consisting of distance sensors, orientation sensors, acceleration sensors, LiDAR sensors, pressure sensors, paint flow rate sensors, temperature sensors, humidity sensors, and combinations thereof.

5. The process according to claim 1, wherein the sensor data acquired in step (iii) is selected from the group consisting of data on the distance between the spray gun and the substrate, data on the orientation of the spray gun with respect to the substrate, data on the movement of the spray gun, data on the contour of the substrate, data on the pressure of the compressed air, data on the flow of the coating composition, temperature data, humidity data and combinations thereof.

6. The process according to claim 1, wherein providing feedback to a user during manual application of the coating composition with the spray gun in step (iv) includes providing the sensor data acquired in step (iii) via a communication interface to the processing unit of the spray gun, processing with the processing unit the provided sensor data to determine whether the provided data is within or outside at least one predefined value, and providing with the signal unit at least one signal to the user in response to the processed sensor data.

7. The process according to claim 1, wherein providing surface property data in step (vii) includes determining surface property data of at least one coating layer applied in step (iii) and providing the determined surface property data to the computer processor via the communication interface.

8. The process according to claim 1, wherein determining the quality of the provided modified or new representation of the coating composition in step (viii) includes providing at least one predefined application value, and at least one predefined surface property value, via a communication interface to the computer processor and determining with the computer processor if the sensor data provided in step (vi) is within at least one predefined application value, and if the surface property data provided in step (vii) is within at least one predefined surface property value.

9. The process according to claim 1, wherein the quality parameter is a classifier being indicative of the acceptability of the provided modified or new representation of the coating composition.

10. The process according to claim 9, wherein the quality of the provided modified or new representation of the coating composition is acceptable if the sensor data provided in step (vi) is within at least one predefined application value and if the surface property data provided in step (vii) is within at least one predefined surface property value.

11. The process according to claim 9, wherein the quality of the provided modified or new representation of the coating composition is acceptable if the sensor data provided in step (vi) is within at least one predefined application value and if the surface property data provided in step (vii) is within a set of predefined application and surface property values.

12. The process according to claim 1, further including the steps of (x) analyzing with the computer processor sensor data provided in step (vi); and/or (xi) optionally providing recommendations via the communication interface if the sensor data provided in step (vi) and/or the surface property data provided in step (vii) is outside of predefined value(s); and/or (xii) generating a further representation if the sensor data provided in step (vi) and/or the surface property data provided in step (vii) is outside of at least one predefined value.

13. The method of claim 1 further comprising screening representations of coating compositions according to a quality criterion.

14. A system comprising a) a modified or new representation of a coating composition, and b) a quality parameter, wherein the quality parameter is determined according to the method of claim 1.

15. A database comprising at least one modified or new representation of a coating composition, wherein the modified or new representation of the coating composition is provided to the database according to the method of claim 1.

16. The process according to claim 1, wherein providing feedback to a user during manual application of the coating composition with the spray gun in step (iv) includes providing the sensor data acquired in step (iii) via a communication interface to the processing unit of the spray gun, processing with the processing unit the provided sensor data to determine whether the provided data is within or outside at least one predefined parameter and/or tolerance, and providing with the signal unit at least one signal to the user in response to the processed sensor data.

17. The process according to claim 1, wherein determining the quality of the provided modified or new representation of the coating composition in step (viii) includes providing at least one predefined application parameter and/or tolerance, and at least one predefined surface property parameter and/or tolerance, via a communication interface to the computer processor and determining with the computer processor if the sensor data provided in step (vi) is within at least one predefined application parameter and/or tolerance, and if the surface property data provided in step (vii) is within at least one predefined surface property parameter and/or tolerance.

18. A system for determining a quality parameter of a representation of a coating composition, said system including:

a) means for providing at least one modified or new representation of the coating composition;

b) a spray gun for manually applying the coating composition to a substrate, the spray gun comprising a sensor unit for acquiring sensor data during operation of the spray gun, a processing unit for processing the acquired sensor data and optionally a signal unit for providing at least one signal in response to the processed sensor data:

c) at least one communication interface;

d) means for providing surface property data of at least one coating layer produced from the provided representation of the coating formulation, wherein the surface property data is determined from the coating layer applied to the substrate and the determined surface property data is provided to the communication interface; and e) means for determining at least one quality parameter of the provided modified or new representation of the coating composition.

* * * * *